United States Patent
Nogami et al.

(10) Patent No.: US 8,043,161 B2
(45) Date of Patent: Oct. 25, 2011

(54) GAME SYSTEM

(75) Inventors: Hisashi Nogami, Kyoto (JP); Yusuke Shiraiwa, Kyoto (JP); Ryutaro Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 760 days.

(21) Appl. No.: 11/647,269

(22) Filed: Dec. 29, 2006

(65) Prior Publication Data

US 2008/0119279 A1 May 22, 2008

(30) Foreign Application Priority Data

Nov. 17, 2006 (JP) ................................. 2006-312258

(51) Int. Cl.
*A63F 13/00* (2006.01)
*G06F 21/00* (2006.01)
*G06F 7/04* (2006.01)

(52) U.S. Cl. ................ 463/43; 705/54; 726/26; 726/27; 726/28; 726/29; 726/30; 726/31; 726/32; 726/33

(58) Field of Classification Search .................... 463/43, 463/40, 44; 395/244; 726/26–33; 705/54
See application file for complete search history.

(56) References Cited

U.S. PATENT DOCUMENTS

| 5,715,403 | A  | * | 2/1998  | Stefik          | 705/44 |
| 6,338,680 | B1 | * | 1/2002  | Connors         | 463/43 |
| 2003/0114227 | A1 | * | 6/2003 | Rubin          | 463/43 |
| 2004/0266506 | A1 | * | 12/2004 | Herbrich et al. | 463/6 |

OTHER PUBLICATIONS

"Instruction Manual for Nintendo GameCube Memory Card 251", Nintendo, Jul. 19, 2002.

* cited by examiner

*Primary Examiner* — Peter DungBa Vo
*Assistant Examiner* — Jeffrey Wong
(74) *Attorney, Agent, or Firm* — Nixon & Vanderhye P.C.

(57) ABSTRACT

A storage section stores a data belonging to a first group and data belonging to a second group, the first and second groups being distinguishable from each other. A communication section communicates with another game apparatus. A transmission control section transmits at least one piece of data of the data stored in the storage section to another game apparatus using the communication section. A reception control section receives the data transmitted from another game apparatus using the communication section. In this configuration, a game apparatus stores the data received using the reception control section, as data belonging to the second group, into the storage section.

18 Claims, 18 Drawing Sheets

US 8,043,161 B2

GAME SYSTEM

CROSS REFERENCE TO RELATED APPLICATION

The disclosure of Japanese Patent Application No. 2006-312258, filed Nov. 17, 2006, is incorporated herein by reference.

TECHNICAL FIELD

The exemplary embodiments disclosed herein relate to a game system comprising a plurality of game apparatuses which can communicate with each other. More particularly, the exemplary embodiments disclosed herein relate to the transfer of game data between a plurality of game apparatuses.

BACKGROUND AND SUMMARY

Conventionally, memory cards have been used as a technique of carrying data which is used between a plurality of game apparatuses (e.g., "Instruction Manual for Nintendo GameCube Memory Card 251", Nintendo, Jul. 19, 2002 (hereinafter referred to as "Non-Patent Document 1")). The memory card is connected to a first game apparatus, and is used to store data resulting from a game process executed in the game apparatus (e.g., data saved in a role playing game). Thereafter, when the memory card is connected to a second game apparatus which can execute the same game process as that described above, the same game can be executed using the data stored by using the first game apparatus. Also in this case, when another memory card is connected to the second game apparatus, and data of the same game is stored in that memory card, players can compete against one another or work as a team in the same game, reflecting the data of each memory card.

However, the above-described memory card disclosed in Non-Patent Document 1 conventionally has the following problem. The above-described memory card is a mere storage medium, and needs to be carried by a player itself in order to exchange data with other game apparatuses, for example. In addition, when data is exchanged, a memory card management screen needs to be activated and a player needs to perform an operation of exchanging data by itself, for example.

Therefore, a feature of certain exemplary embodiments is a game system in which data can be transferred and used between a plurality of game apparatuses without an operation by a player.

Certain exemplary embodiments have the following aspects to attain the feature mentioned above. Note that reference numerals, additional descriptions and the like inside parentheses indicate correspondence to exemplary embodiments described below for the sake of easy understanding, and do not limit the certain exemplary embodiments described herein.

A first aspect of certain exemplary embodiments is directed to a game system comprising a plurality of game apparatuses (3) which are connected via a network. The game apparatus comprises a storage section (33), a communication section (6), a transmission control section (30), and a reception control section (30). The storage section stores a data belonging to a first group and data belonging to a second group, the first and second groups being distinguishable from each other. The communication section communicates with another game apparatus. The transmission control section transmits at least one piece of data of the data stored in the storage section to another game apparatus using the communication section. The reception control section receives the data transmitted from another game apparatus using the communication section. The game apparatus stores the data received using the reception control section as data belonging to the second group into the storage section. Note that the game apparatuses may be configured to be connected to a network and communicate with each other via the network. Alternatively, the game apparatuses may communicate directly with each other via short-distance radio communication or the like. The transmission control section selects at least one piece of data from the data stored in the storage section based on a user's operation or automatically by a program, and transmits the selected data.

In a second aspect based on the first aspect, the game apparatus further comprises a player object selecting section for selecting data of a player object from the data belonging to the first group stored in the storage section, and a non-player object selecting section for selecting data of a non-player object from the data belonging to the second group stored in the storage section. Note that the storage section stores image data (texture data, polygon data, and other image data) of a character, a parameter (ability parameter) of a character, or the like. In the former, data selected by the player object selecting section is used to display a player object. In the latter, data selected by the player object selecting section is used as a parameter of a player object. Typically, based on a user's operation, the player object selecting section selects data desired by the user from the data belonging to the first group stored in the storage section, and the non-player object selecting section automatically selects data from the data belonging to the second group stored in the storage section using a program (e.g., randomly).

In a third aspect based on the second aspect, data stored in the storage section is image data of an object. The game apparatus further comprises a display control section for displaying a player object in a virtual space using the data selected by the player object selecting section, and displaying a non-player object in the virtual space using the data selected by the non-player object selecting section.

In a fourth aspect based on the first aspect, the game apparatus further comprises an editing section for editing data stored in the storage section based on a user's operation. The editing section can select only the data belonging to the first group of the data stored in the storage section as data to be edited.

In a fifth aspect based on the fourth aspect, of the data belonging to the first group, data which is not generated by a game apparatus in which the data belonging to the first group is stored, cannot be edited.

In a sixth aspect based on the first aspect, the game apparatus further comprises a first selection section for selecting data stored in the storage section using random numbers. The transmission control section transmits the data selected by the first selection section. Note that the first selection section may select, from the data stored in the storage section, only the data belonging to the first group, only the data belonging to the second group, or all the data.

In a seventh aspect based on the first aspect, the storage section further stores destination address information which is information indicating a location of another game apparatus on a network. The transmission control section transmits the data to a destination address selected using random numbers of the destination address information.

In an eighth aspect based on the first aspect, the game apparatus further comprises a second selection section for selecting data desired by a user from the data belonging to the first group of the data of the storage section based on a user's operation. The transmission control section transmits the data selected by the second selection section.

In a ninth aspect based on the first aspect, the transmission control section transmits the data with predetermined timing which does not depends on a player's operation.

According to certain exemplary embodiments, the data belonging to the first group or the second group is automatically transmitted and received even without a player's transmission operation. Further, data transmitted by a sender is registered as data belonging to the second group in a transmission destination no matter whether the data transmitted by the sender belongs to the first group or the second group. Therefore, the number of pieces of data belonging to the second group in each game apparatus main body can be increased without a player being aware of it.

These and other features, aspects and advantages of certain exemplary embodiments will become more apparent from the following detailed description when taken in conjunction with the accompanying drawings.

DETAILED DESCRIPTION

Hereinafter, certain exemplary embodiments will be described with reference to the accompanying drawings. Note that the certain exemplary embodiments are not restricted by the embodiments described herein.

First Exemplary Embodiment

Figure 1:
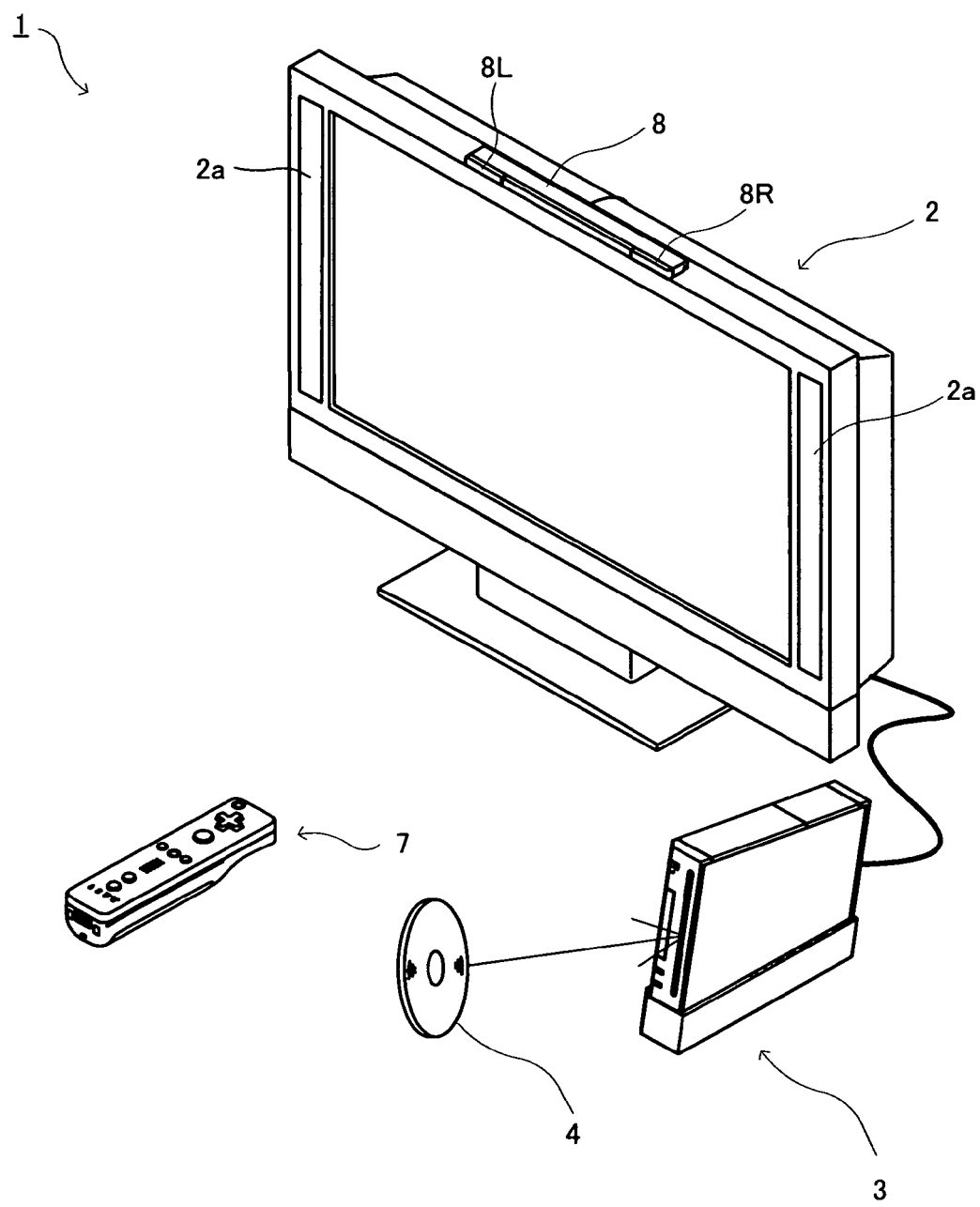
FIG. 1 is an external view of a game system 1 according to an exemplary embodiment.
Figure 2:
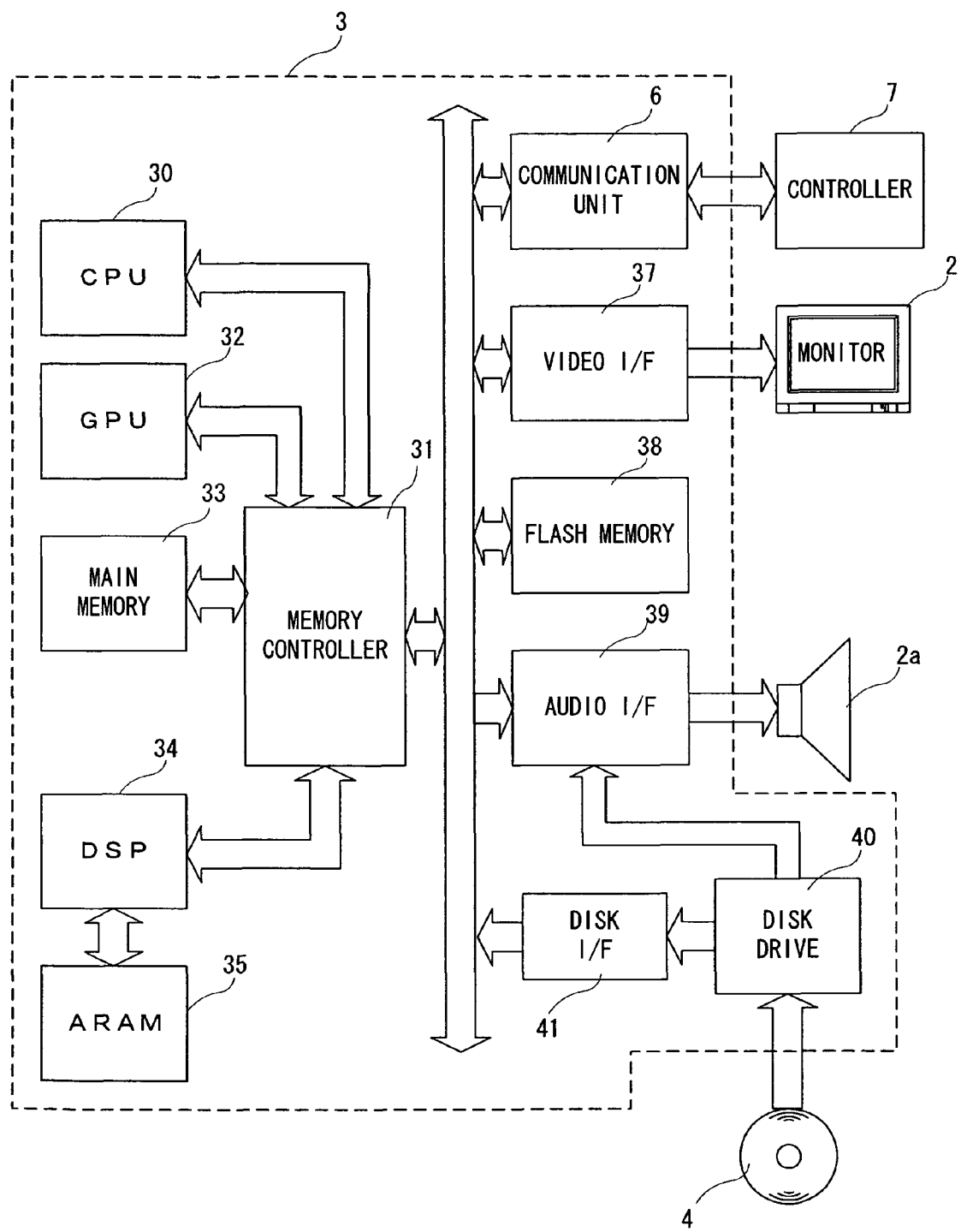
FIG. 2 is a block diagram of a game apparatus 3 of FIG. 1.

An information processing apparatus according to an exemplary embodiment will be described with reference to FIG. 1. Hereinafter, as a specific example, a game system including a stationary game apparatus as an example of the information processing apparatus will be described. Note that FIG. 1 is an external view of a game system 1 including a stationary game apparatus main body 3, and FIG. 2 is a block diagram of the game apparatus 3. Hereinafter, the game system 1 will be described.

In FIG. 1, the game system 1 comprises a television set for home use (hereinafter referred to as a monitor) 2 as an exemplary display means, and the stationary game apparatus main body 3 connected to the monitor 2 via a connection cord. The monitor 2 comprises a loudspeaker 2a for outputting sound based on an audio signal output from the game apparatus main body 3. The game apparatus main body 3 comprises an optical disc 4 which stores a game program as an exemplary information processing program of the certain exemplary embodiments, the game apparatus main body 3 including a computer for executing the game program of the optical disc 4 and outputting and displaying a game screen on the monitor 2, and a controller 7 for inputting, to the game apparatus main body 3, operational information required for a game, such as an image of a character displayed on the game screen or the like.

The game apparatus main body 3 includes a communication unit 6. The communication unit 6 receives data which is wirelessly transmitted from the controller 7, and transmits data from the game apparatus main body 3 to the controller 7, i.e., connects the controller 7 and the game apparatus main body 3 via wireless communication. The optical disc 4 which is an exemplary information storing medium changeable with respect to the game apparatus main body 3 is detachably attached to the game apparatus main body 3. On a front major surface of the game apparatus main body 3, a power ON/OFF switch for the game apparatus main body 3, a game process reset switch, a slot through which the optical disc 4 is detached or attached, an eject switch for removing the optical disc 4 through the slot of the game apparatus main body 3, and the like are provided.

A flash memory 38 which functions as a backup memory for fixedly storing saved data or the like is provided in the game apparatus main body 3. The game apparatus main body 3 executes a game program or the like stored on the optical disc 4, and displays a result of the execution as a game image on the monitor 2. The game apparatus main body 3 can also reproduce a game state which was executed in the past, using the saved data stored in the flash memory 38, and display a game image on the monitor 2. The player of the game apparatus main body 3 can enjoy events of the game by operating the controller 7 while watching the game image displayed on the monitor 2.

The controller 7 wirelessly transmits transmission data, such as operational information or the like, to the game apparatus main body 3 including the communication unit 6 using, for example, the Bluetooth® technique. The controller 7 is an operation means for mainly operating a player character or the like appearing in a game space displayed on the display screen of the monitor 2. The controller 7 is provided with a housing having a size which allows the player to hold the controller 7 with one hand, and a plurality of operation buttons (including a cross key, a stick, and the like) provided and exposed on a surface of the housing. The controller 7 also comprises an image capture information computing section 74 for capturing an image viewed from the controller 7 as specifically described below. As exemplary objects whose images to be captured by the image capture information computing section 74, two LED modules (hereinafter referred to as markers) 8L and 8R are provided in the vicinity of the display screen of the monitor 2. The markers 8L and 8R each emit infrared light toward the front of the monitor 2. A unique ID for the controller 7 is stored in the controller 7 in a nonvolatile manner.

The game apparatus main body 3 (the communication unit 6) and the controller (a communication section 75) can be connected to each other via communication to communicate various data therebetween. Specifically, the game apparatus main body 3 can transmit control data or game data (game data in a main memory 33 or the flash memory 38) to the controller 7, while the controller 7 can transmit operational information or game data (game data in a memory 752) of an operation section 72 to the game apparatus main body 3. Note that, when game data is transmitted from the game apparatus main body 3 to the controller 7, a control signal indicating the transmission is transmitted from the game apparatus main body 3 to the controller 7. The control signal designates an address of the memory 752 at which the game data is to be stored. When game data is transmitted from the controller 7 to the game apparatus main body 3, a control signal requesting the transmission is initially transmitted from the game apparatus main body 3 to the controller 7, and in response to the control signal, the game data is transmitted from the controller 7 to the game apparatus 3. The control signal designates an address of the memory 752 at which the game data is read out. The controller 7 can also receive transmission data wirelessly transmitted from the communication unit 6 of the game apparatus main body 3 using the communication section 75, and generate sound or vibration depending on the transmission data.

In FIG. 2, the game apparatus main body 3 comprises, for example, a CPU (Central Processing Unit) 30 which executes various programs. The CPU 30 executes a boot program stored in a boot ROM (not shown) and performs, for example, initialization of memories, such as a main memory 33 and the like, before executing a game program stored on the optical disc 4, and performs a game process or the like corresponding to the game program. A GPU (Graphics Processing Unit) 32, the main memory 33, a DSP (Digital Signal Processor) 34, an ARAM (Audio RAM) 35, and the like are connected via a memory controller 31 to the CPU 30. The communication unit 6, a video I/F (interface) 37, the flash memory 38, an audio I/F 39, and a disk I/F 41 are connected via a predetermined bus to the memory controller 31. The monitor 2, an external memory card 5, the loudspeaker 2a, and a disk drive 40 are connected to the video I/F (interface) 37, the flash memory 38, the audio I/F 39, and the disk I/F 41, respectively. Note that the main memory 33 is a volatile memory, which loses stored data if power is not supplied.

The GPU 32 performs image processing based on a command from the CPU 30, and comprises, for example, a semiconductor chip which performs a calculation process required for 3D graphics display. The GPU 32 performs image processing using a memory specialized for image processing (not shown) or a memory area which is a portion of the main memory 33. The GPU 32 uses these to generate game image data or movie video to be displayed on the monitor 2, and outputs the data via the memory controller 31 and the video I/F 37 to the monitor 2, as required.

The main memory 33 is a memory area which is used by the CPU 30, and stores a game program or the like required for a process by the CPU 30, as required. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated by the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data). The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. The communication unit 6 is connected via the above-described bus to the game apparatus main body 3. As described above, the communication unit 6 receives transmission data from the controller 7, and outputs the transmission data to the CPU 30. The communication unit 6 also transmits transmission data output from the CPU 30 to the communication section 75 of the controller 7. The monitor 2 is connected to the video I/F 37. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus main body 3.

Figure 3:
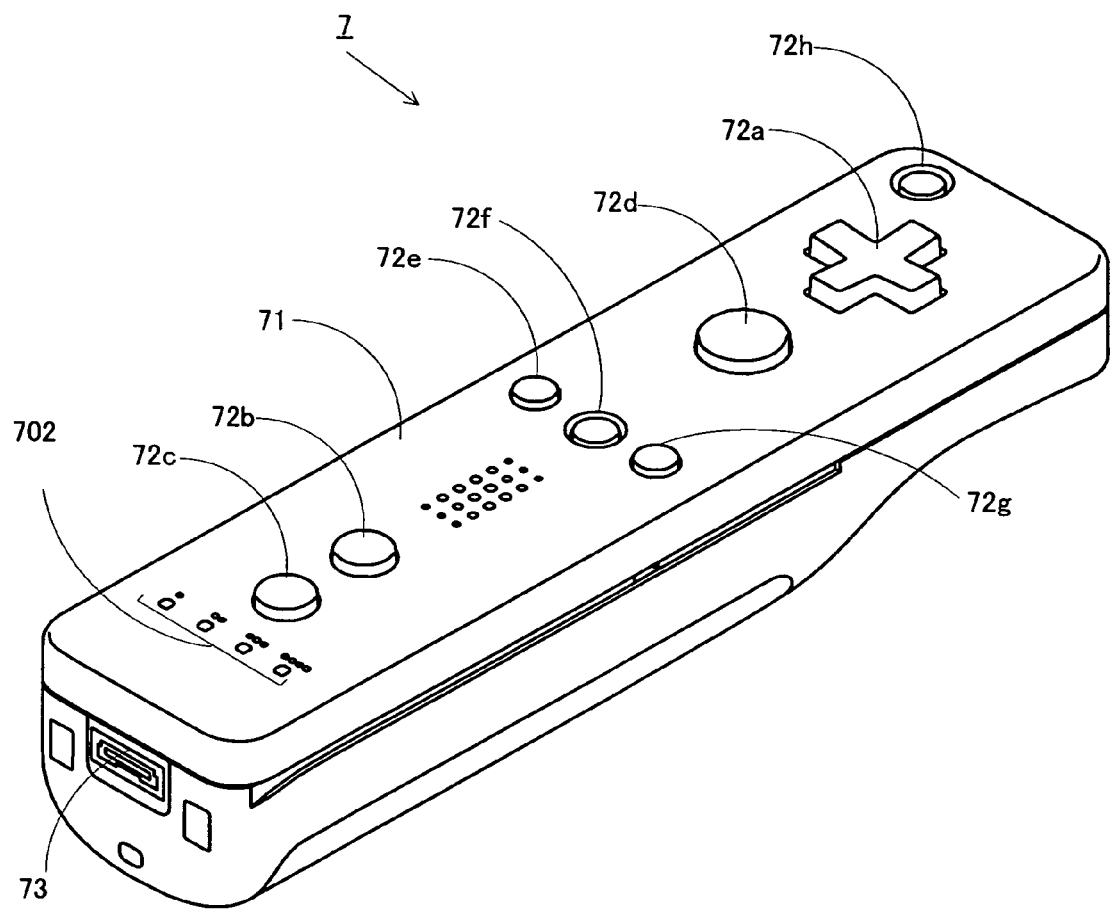
FIG. 3 is a perspective view of a controller 7 of FIG. 1 as viewed from the top and the rear.
Figure 3:
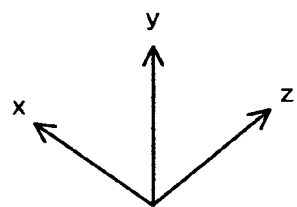
Figure 4:
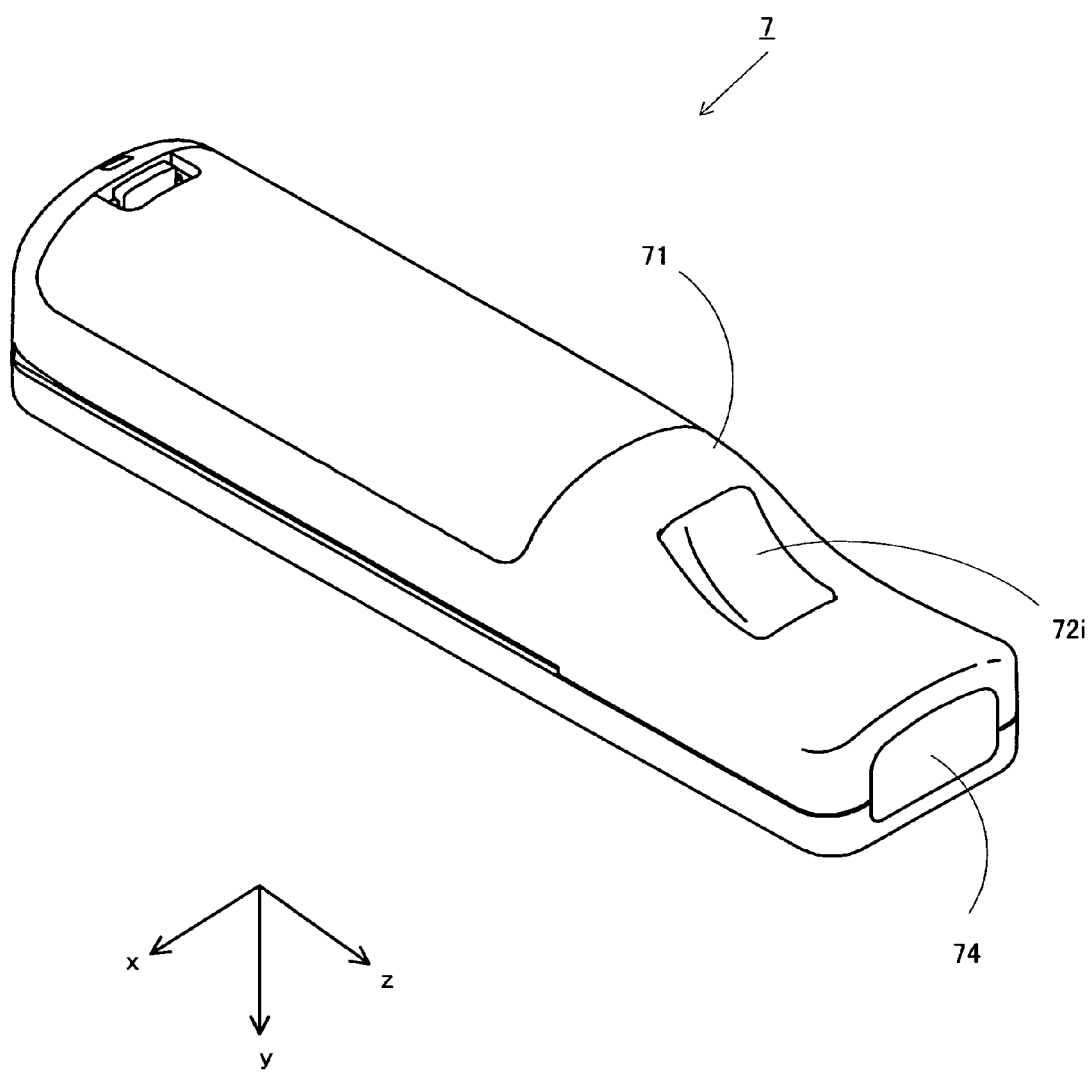
FIG. 4 is a perspective view of the controller 7 of FIG. 3 as viewed from the bottom and the front.

The controller 7 will be described with reference to FIGS. 3 and 4. Note that FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71, and an operation section 72 comprising a plurality of operation buttons provided on a surface of the housing 71. The housing 71 of this example is in the shape of substantially a rectangular parallelepiped where a front-to-rear direction is a longitudinal direction. The whole housing 71 has a size which allows an adult and a child to hold the controller 7 with one hand. The housing 71 is formed by, for example, plastic molding.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any one of the frontward, rearward, leftward and rightward directions is selected by a player pushing down a corresponding one of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the above-described direction input operation by the player, or may be an operation section of other exemplary embodiments. For example, an operation section may be provided in which four push switches are disposed in cross directions, and an operation signal is output, depending on a push switch pushed down by the player. In addition to the four push switches, a center switch may be provided at an intersection position of the cross directions, i.e., a complex operation section comprising the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 3. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 3. The operation button 72h is also a button of the type whose upper surface is buried below the upper surface of the housing so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform a player of controller identification currently set for the controller 7. Specifically, when transmission data is transmitted from the controller 7 to the communication unit 6, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing a front surface of the controller 7 toward the markers 8L and 8R. An operation button 72i is provided on a rear slope surface of the hollow portion. The operation button 72i is an operation section which functions as, for example, a B button.

An image capturing device 743 which is a part of the image capture information computing section 74 is provided on a front surface of the housing 71. Here, the image capture information computing section 74 is a system for analyzing image data captured by the controller 7 to determine a place having a high luminance in the image data and detect a center-of-gravity position, a size or the like of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to be engaged and connected with a connection cable.

Here, in order to specifically describe certain exemplary embodiments, a coordinate system which is set with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5:
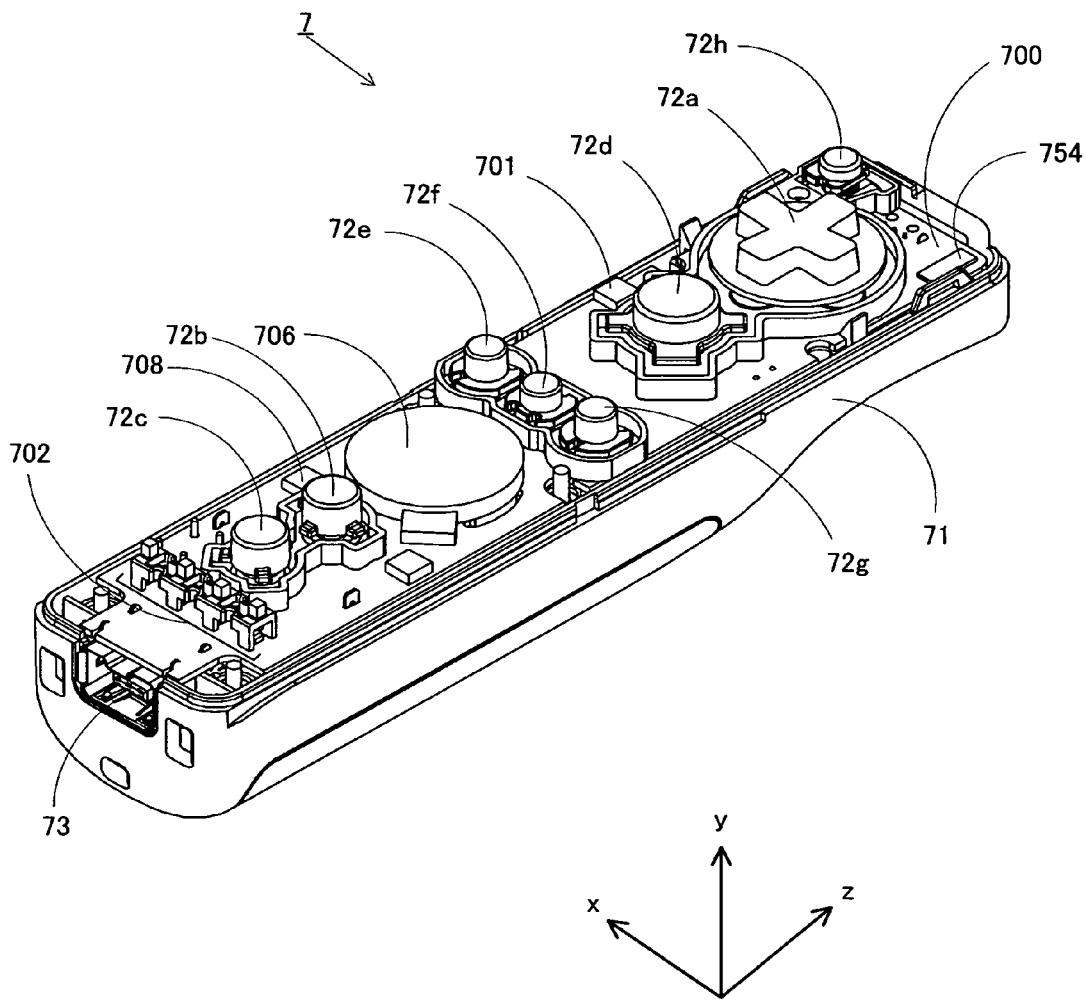
FIG. 5 is a perspective view of the controller 7 of FIG. 3 where an upper housing thereof is cut away.
Figure 6:
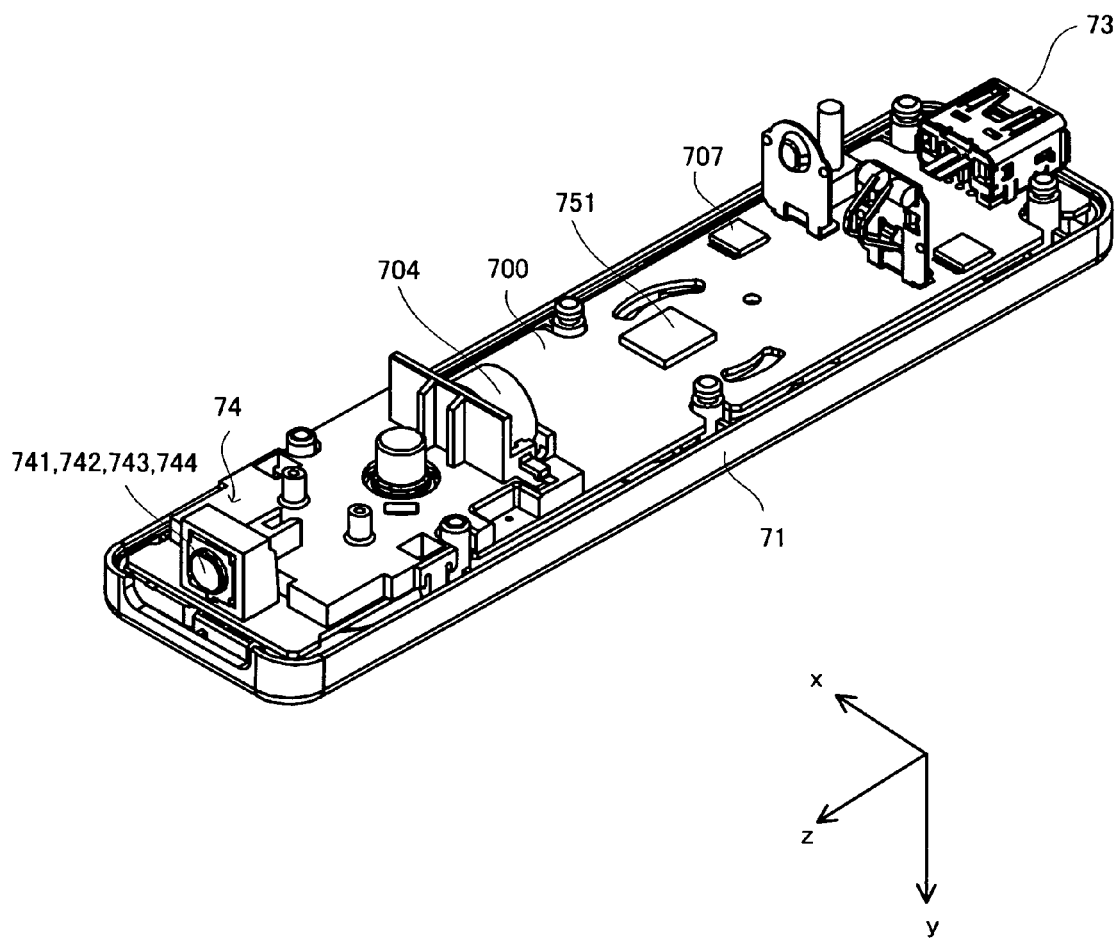
FIG. 6 is a perspective view of the controller 7 of FIG. 3 where a lower housing thereof is cut away.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via conductors (not shown) formed on the base board 700 and the like. The microcomputer 751 functions to generate operation button data, depending on the operation button 72a or the like, as an exemplary button data generating means of certain exemplary embodiments. This mechanism, which is a known technique, is implemented, for example, by the microcomputer 751 detecting contact/disconnection of a conductor by a switching mechanism, such as a tactile switch or the like, which is provided under a key top. More specifically, for example, when an operation button is pushed down to contact a conductor, a current flows. The microcomputer 751 detects the current flow to determine which operation button has been pushed down, and generates a signal, depending on the operation button.

Also, by a radio module 753 (see FIG. 7) and an antenna 754, the controller 7 functions as a wireless controller. Note that a quartz oscillator 703 (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72d on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity by the game apparatus main body 3 or the like.

On the other hand, in FIG. 6, the image capture information computing section 74 is provided at a front edge on a lower major surface of the base board 700. The image capture information computing section 74 comprises an infrared filter 741, a lens 742, an image capturing device 743, and an image processing circuit 744, which are arranged in this order from the front of the controller 7, and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 3.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 3. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somewhat closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

Figure 7:
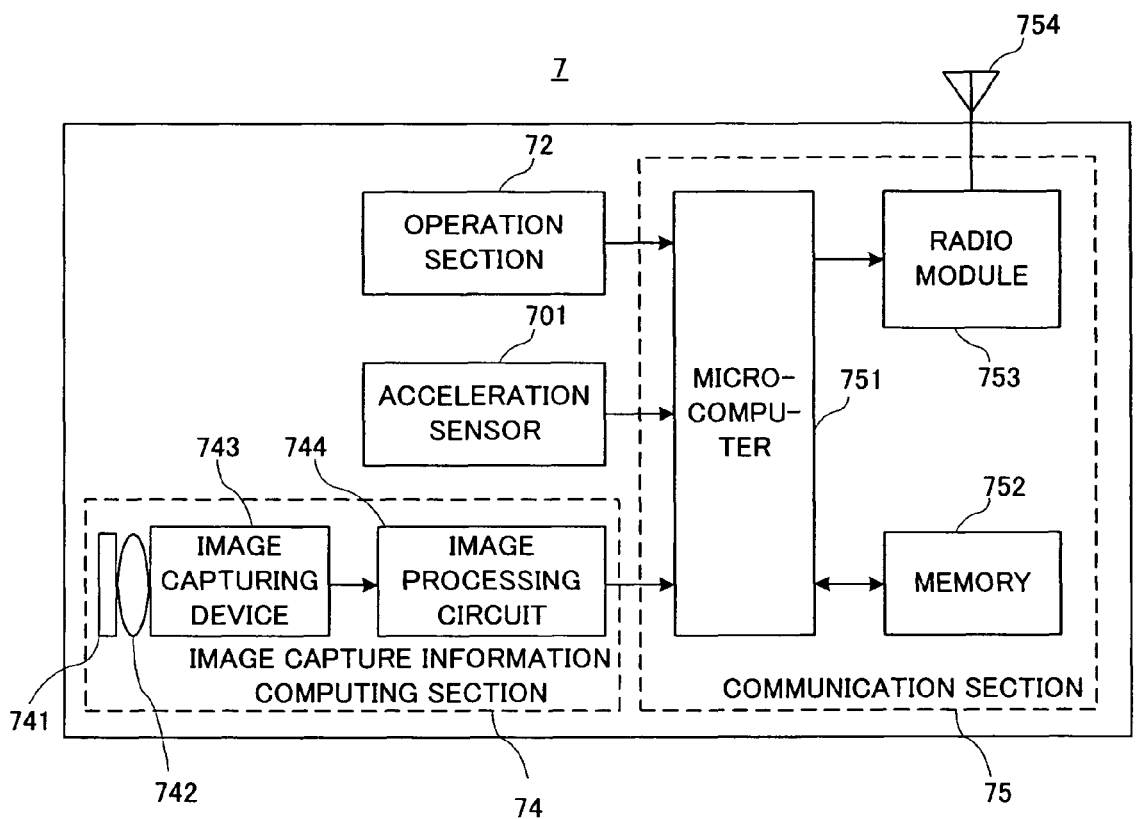
FIG. 7 is a block diagram illustrating a configuration of the controller 7 of FIG. 3.

In FIG. 7, the controller 7 comprises the communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing device 743, and the image processing circuit 744. The infrared filter 741 passes only infrared light entering from the front of the controller 7. The lens 742 collects infrared light passing through the infrared filter 741 and causes the light to enter the image capturing device 743. The image capturing device 743 may be, for example, a solid-state image capturing device, such as a CMOS sensor or a CCD, and captures infrared light collected by the lens 742. Therefore, the image capturing device 743 captures only infrared light passing through the infrared filter 741 to generate image data. The image data generated by the image capturing device 743 is processed by the image processing circuit 744. Specifically, the image processing circuit 744 processes the image data obtained from the image capturing device 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. A signal depending on a position or a motion of the controller 7 can be obtained based on the process result data output from the image capture information computing section 74, as described below.

The controller 7 preferably comprises the acceleration sensor 701 which senses accelerations along with three axes (X, Y and Z axes). The three-axis acceleration sensor 701 senses linear accelerations in three directions, i.e., a vertical direction, a lateral direction, and a front-to-rear direction. In other exemplary embodiments, the acceleration sensor 701 may be a two-axis acceleration detecting means which senses linear accelerations along two axes in the vertical direction and the lateral direction (or other direction pairs), depending on the type of control signals used in a game process. For example, the three- or two-axis acceleration sensors 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, three- or two-axis acceleration sensors 701 may be provided using a technique of an existing acceleration detecting means (e.g., a piezoelectric type or a piezoelectric resistance type) or other appropriate techniques which will be developed in the future.

It is known by those skilled in the art that an acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the two or three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated by performing an additional process with respect to an acceleration signal output from the acceleration sensor 701. For example, when a static acceleration (gravitational acceleration) is sensed, an output from the acceleration sensor 701 is used to perform a computation using a tilt angle and the sensed acceleration, thereby making it possible to determine a tilt of a subject (the controller 7) with respect to a gravity vector. Thus, by using the acceleration sensor 701 in combination with the microcomputer 751 (or other processors), the tilt, attitude or position of the controller 7 can be determined. Similarly, for example, when the controller 7 comprising the acceleration sensor 701 is dynamically accelerated and moved by a player's hand, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravitational acceleration) by the acceleration sensor, may be for converting a sensed acceleration signal into a tilt angle corresponding thereto (or other preferable parameters). Data indicating the accelerations sensed by the acceleration sensor 701 is output to the communication section 75.

In other exemplary embodiments, as an acceleration sensor for detecting a motion of the controller 7, a gyro-sensor comprising a rotation element, a vibration element, or the like may be employed. An exemplary MEMS gyro-sensor used in this exemplary embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on the individual application, and processes performed for output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt is calculated from the initialized tilt value. In this case, the calculated tilt has a value corresponding to an angle. On the other hand, when an acceleration sensor is used to calculate a tilt, the tilt is calculated by comparing the value of a component about each axis of a gravity acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The properties of gyro-sensors as well as the basic difference between the acceleration detecting means and the gyro-sensor are know to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this exemplary embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75.

An operation signal (key data) from the operation section 72 provided in the controller 7, acceleration signals (X-, Y- and Z-axis direction acceleration data; hereinafter simply referred to as acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the communication unit 6, into the memory 752. Here, radio transmission from the communication section 75 to the communication unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the communication unit 6 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth® technique. Specifically, the key data from the operation section 72 provided in the controller 7, the acceleration data from the acceleration sensor 701, and the process result data from the image capture information computing section 74 are modulated into a radio signal by the radio module 753, and the radio signal is transmitted from the controller 7. Thereafter, the communication unit 6 of the game apparatus main body 3 receives the radio signal, and the game apparatus main body 3 demodulates or decodes the radio signal, thereby obtaining a series of pieces of operational information (the key data, the X-, Y- and Z-axis direction acceleration data, and the process result data). Thereafter, the CPU 30 of the game apparatus main body 3 performs a game process based on the obtained operational information and a game program. Note that, when the communication section 75 is configured using the Bluetooth® technique, the communication section 75 can also have a function of receiving transmission data wirelessly transmitted from other devices.

There are a number of game apparatus main bodies 3 and controllers 7 (a large number of pieces for each are commercially available). Typically, each user possesses a game apparatus main body 3 and at least one controller 7. A controller 7 can be used as an input device for any game apparatus main body 3. In other words, a controller 7 possessed by a user can be used as an input device for a game apparatus main body 3 possessed by another user. However, in order to use a controller 7 as an input device for a game apparatus main body 3, a communication link needs to be established between these devices. Specifically, a request for a link is transmitted from the controller 7 to the game apparatus main body 3 (e.g., in a controller 7 which has not established a communication link with any game apparatus main body 3, when any operation button of the operation section 72 is operated, a link request is transmitted to the game apparatus main body 3). Thereafter, a communication link is established between the game apparatus main body 3 which has received the link request and the controller 7 which has transmitted the link request, and connection identification information (e.g., a connection handle in Bluetooth®) is generated. Here, a communication link can be established only for a previously registered game apparatus main body(s) 3. In other words, identification information about a game apparatus main body 3 is previously registered in the controller 7 (a memory in the controller 7; the memory is preferably non-volatile) and/or identification information about the controller 7 is preferably registered in the game apparatus main body 3 (a memory in the main body 3; the memory is preferably non-volatile). The controller 7 can transmit a link request only to the previously registered game apparatus main body 3 (i.e., the controller 7 transmits a link request including the identification information about the previously registered main body 3) and/or the game apparatus main body 3 can receive a link request only from the previously registered controller 7 (either permanently or temporarily registered as described below) (i.e., the controller 7 transmits a link request including its own identification information, so that the main body 3 can receive only a link request having the identification information about the previously registered controller 7). Note that a method for previous registration will be described below.

Here, in this example, a plurality of controllers 7 (four in this example) can be simultaneously used as input devices for a game apparatus main body 3. Specifically, the game apparatus main body 3 (the communication unit 6) can simultaneously establish a communication link with a maximum of four controllers 7 (the communication sections 75). In this case, a connection handle is generated for each communication link, and is shared by the game apparatus main body 3 and a corresponding controller 7. Also, the game apparatus main body 3 can distinguish the communication links from each other by assigning a predetermined identification number (referred to as a channel number) to each connection handle. A correspondence relationship between the connection handles and the channel numbers is stored in a channel setting area in an internal memory (e.g., the main memory 33). Specifically, in the channel setting area, a connection handle is stored for each channel number. When the game apparatus main body 3 has established communication links with a plurality of controllers 7, it is arbitrarily determined which channel number is assigned to which connection handle. For example, a channel number 1 may be assigned to a connection handle for which a communication link is established in the first place, and thereafter, channel number 2, 3 or 4 may be assigned every time a communication link is established.

A controller 7, when transmitting operational information of the operation section 72 or game data stored in the memory 752 to the game apparatus main body 3, adds the connection handle to the transmission data. The game apparatus main body 3 receives communication data having the connection handle set in the channel setting area. Also, the game apparatus main body 3, when transmitting control data or game data to the controller 7, adds the connection handle to the transmission data.

Note that the identification information for a controller 7 may be registered in the game apparatus main body 3 when a communication link is established, without generating connection identification information (connection handle). In this case, the controller 7, when transmitting data, may add its own controller identification information to the transmission data, and the game apparatus main body 3 may receive communication data having the registered identification information. Alternatively, the game apparatus main body 3, when transmitting control data or game data to the controller 7, may add the registered identification information to the transmission data, and the controller 7 may receive communication data having its own identification information.

Next, the above-described method for previous registration will be described. There are two registration methods. In the following description, one of the methods is referred to as "permanent registration", and the other method is referred to as "temporary registration". Firstly, the permanent registration method will be described. A program for the permanent registration process (for a game apparatus main body 3) is stored in a non-volatile memory (e.g., the flash memory 38) of the game apparatus main body 3, and is executed by the CPU 30. A program for a controller 7 is stored in a non-volatile memory of the controller 7, and is executed by a processing section of the controller 7. In the permanent registration, when a user operates an operation section a (not shown) of the main body 3, the game apparatus main body 3 broadcasts predetermined data via the communication unit 6 to the controller 7 present around the game apparatus main body 3, while waiting for a response from the controller 7. When there is a response, the game apparatus main body 3 performs a connection process with respect to the responding controller 7. On the other hand, when an operation section b (either an operation not shown or an operation shown) of the controller 7 is operated by the user, the controller 7 waits for transmission of the predetermined data from the game apparatus main body 3 present around the controller 7. When the controller 7 receives the predetermined data, the controller 7 responds and performs a connection process with respect to the game apparatus main body 3 which has transmitted the predetermined data. Thus, the game apparatus main body 3 and the controller 7 are connected to each other. Thereafter, identification information (a Bluetooth® address or a MAC address) is exchanged between the game apparatus main body 3 and the controller 7. Specifically, a Bluetooth® address, a MAC address or the like is stored as unique identification information in each of the non-volatile memories included in the game apparatus main body 3 and the controller 7. Thereafter, the game apparatus main body 3 receives identification information about the connected controller 7, and stores the identification information into a controller registration area in a non-volatile memory (e.g., the flash memory 38) included therein. The controller registration area is an area in which a plurality of pieces of identification information about controllers 7 which can be used for the game apparatus main body 3 can be registered. On the other hand, the controller 7 receives identification information about the connected game apparatus main body 3, and registers the identification information into a main body registration area of a non-volatile memory (e.g., the memory 752) included therein. The main body registration area is an area in which a plurality of pieces of identification information about main bodies which can be used by the controller 7 can be registered. A game apparatus main body 3 performs the above-described registration process with respect to a plurality of controllers 7, so that identification information about the controllers 7 can be registered into the controller registration area of the game apparatus main body 3. A controller 7 performs the above-described registration process with respect to a plurality of game apparatuses main bodies 3, so that identification information about the game apparatuses main bodies 3 can be registered in the main body registration area of the controller 7. Note that the process of registering identification information about a game apparatus main body 3 into a controller 7 may be removed, depending on a communication method.

Next, the temporary registration method will be described. In a main body 3, when a predetermined application (an application which is stored on the optical disc 4, is read out by a disk drive, and is executed, or an application stored in the flash memory 38) is executed, a predetermined command included in the application is executed by the CPU 30, so that a process equivalent to when the operation section a is operated by the user is executed. When an operation section c (or the operation section b) of a controller 7 is operated by the user, a process equivalent to when the operation section b is operated by the user is executed. Thereafter, a process equivalent to that described above is executed between the game apparatus main body 3 and the controller 7, so that identification information about the controller 7 is registered into the game apparatus main body 3, while identification information about the game apparatus main body 3 is registered into the controller 7. Note that, here, in the temporary registration, the game apparatus main body 3 registers the identification information about the controller 7 into a controller registration area of a RAM 33, which is a volatile memory. In other words, the identification information about the controller 7 registered by temporary registration is erased when the game apparatus main body 3 is powered OFF. Note that the controller identification information registered by temporary registration may be erased with different timing (e.g., when an application is finished). Note that the identification information about the main body 3 is registered by temporary registration into the same area in the controller 7 as when permanent registration is performed.

As described above, identification information about a controller 7 which can be used for a game apparatus main body 3 is registered into the game apparatus main body 3, while identification information about a game apparatus main body 3 which can be used for a controller 7 is registered into the controller 7. Note that the process of registering identification information about a game apparatus main body 3 into a controller 7 may be removed as in the permanent registration.

Next, an outline of a process assumed in a first exemplary embodiment will be described. In the first exemplary embodiment, the user creates a facial image of a character object (hereinafter referred to as a character image) used in a predetermined game by executing an editor application (hereinafter referred to as a character editor) in a game apparatus main body 3. The process of the first exemplary embodiment relates to exchange of the character image between a plurality of game apparatus main bodies 3 via a controller 7. Note that the editor application is stored in the flash memory 38 (or a non-volatile memory (not shown) of the main body 3), and is loaded and executed in the main memory 33 when a menu application (not shown; stored in the flash memory 38 or a non-volatile memory (not shown) of the main body 3) is used to provide an instruction to start up the editor application. The editor application may be stored on the optical disc 4, may be read out by a disk drive, and may be loaded and executed in the main memory 33.

In the flash memory 38 of the game apparatus main body 3, two database areas are prepared as areas for storing the character image. One of the two database areas is referred to as a front character database (hereinafter referred to as a front DB), and can save character image data (hereinafter simply referred to as character images) of 100 characters. The other is referred to as a back character database (hereinafter referred to as a back DB), and can save character images of 10,000 characters. Character images stored in the front DB (hereinafter referred to as front character images) can be freely edited by the user. A character image newly created by the user is saved into the front DB. In addition, character images can be viewed or erased. On the other hand, character images saved in the back DB (hereinafter referred to as back character images) cannot be newly created or edited by the user, and can be only viewed and deleted. Character images can also be transferred from the back DB to the front DB. Note that, in this case, character images created by other users cannot be edited even when they are stored in the front DB. In other words, the user can edit only character images created by itself of the character images saved in the front DB. As image data for displaying a player character, the user can select a desired character image from a list of character images saved in the front DB. As image data for displaying a non-player character, a character image is automatically randomly selected from the character images saved in the back DB.

Also, as described above, a controller 7 includes a memory 752. Therefore, a character image created by the user can be transmitted from a game apparatus main body 3 into the controller 7 and saved into the memory 752. Further, the character image stored in the memory 752 can be read from the controller 7 to another game apparatus main body 3, which can in turn utilize the character image. In other words, a character image can be moved and transferred between different game apparatus main bodies 3 via a controller 7. In this case, although the back DB can save as many as 10,000 character images as described above, the number of character images cannot be quickly increased by the user moving character images using a manual operation. Therefore, by performing the process of this exemplary embodiment, the number of back character images saved in the back DB can be quickly increased.

Figure 8:
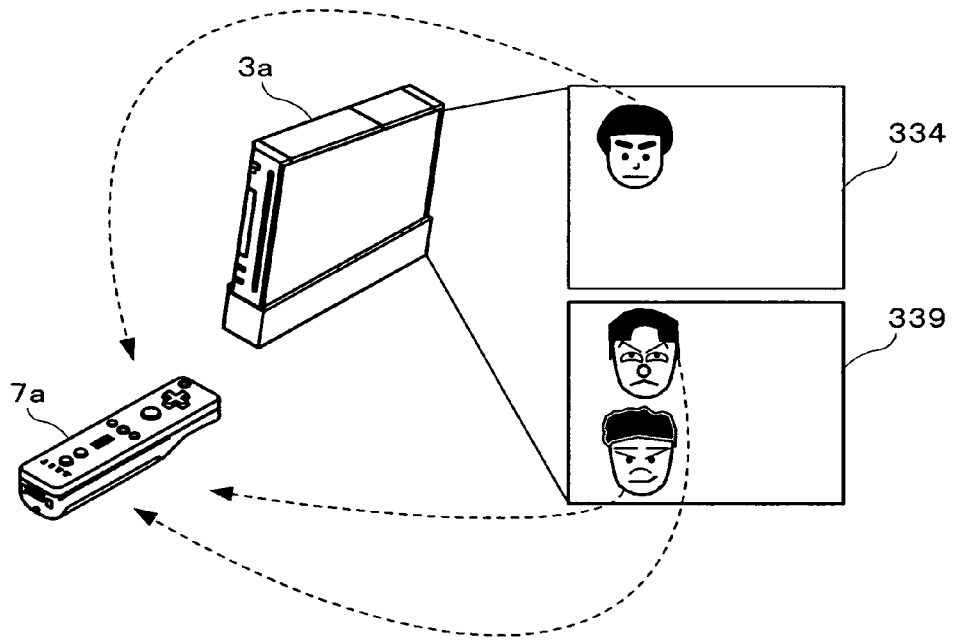
FIG. 8 is a diagram for describing an outline of a process of transferring a character image in a first exemplary embodiment.
Figure 9:
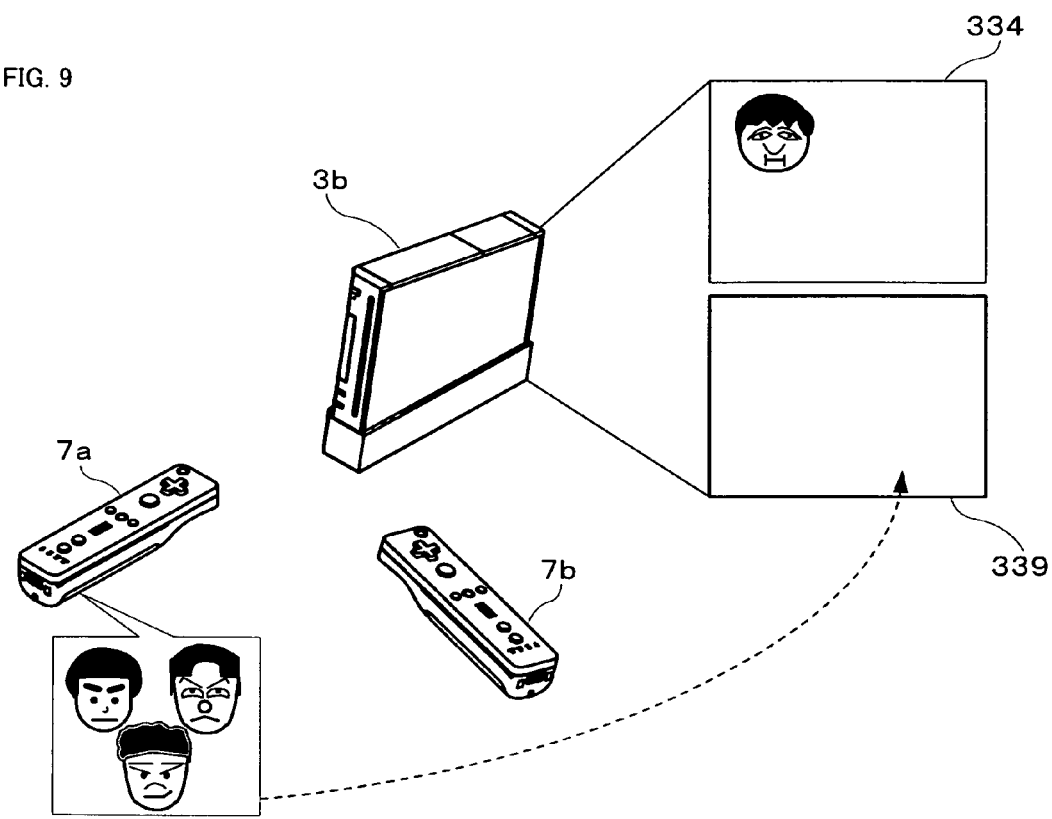
FIG. 9 is a diagram for describing an outline of the process of transferring a character image in the first exemplary embodiment.
Figure 10:
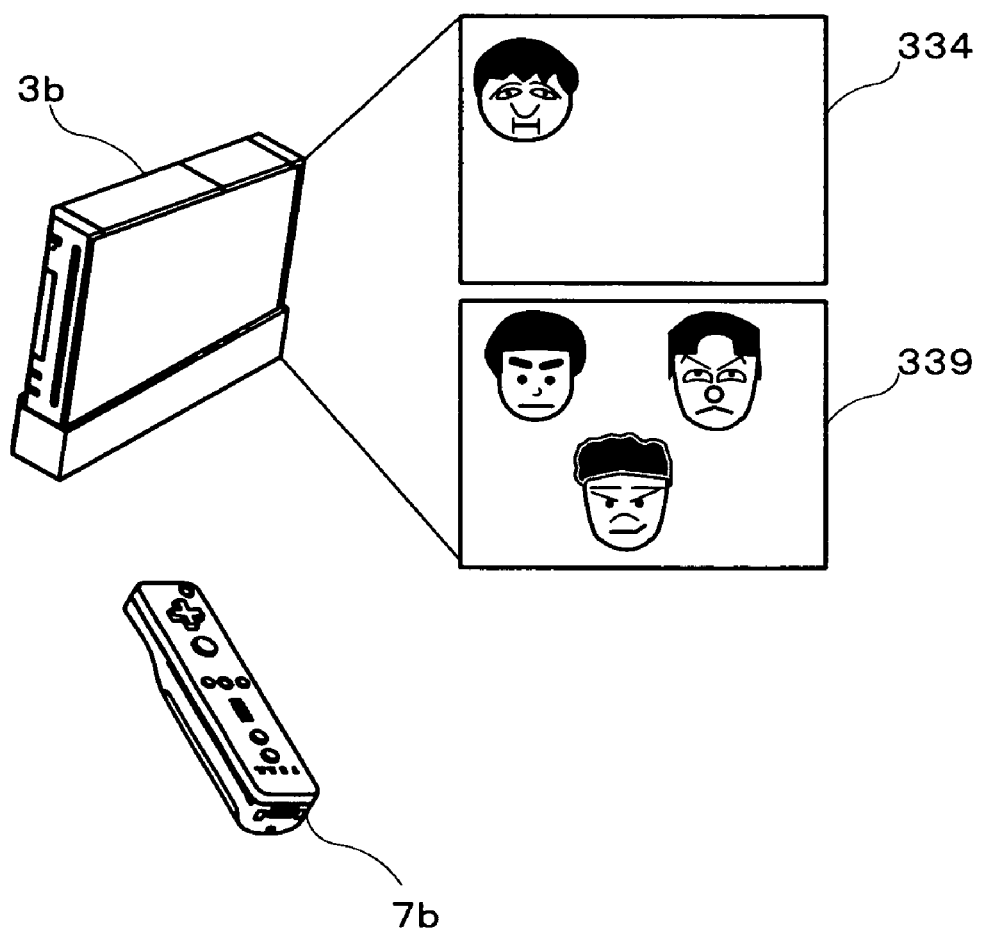
FIG. 10 is a diagram for describing an outline of the process of transferring a character image in the first exemplary embodiment.

In this exemplary embodiment, the following operation is performed. FIGS. 8 to 10 are diagrams for describing an outline of a character image transfer process of this exemplary embodiment. In FIGS. 8 to 10, a controller 7 is connected to a game apparatus main body 3 via wireless communication. Each game apparatus main body 3 has a front DB 334 and a back DB 339.

Initially, a user A uses its own game apparatus main body 3a (hereinafter referred to as a game machine A) to execute an editor application (hereinafter referred to as a character editor) to create an image of a character's face (front character image). The created face image data is saved into a front DB area of the flash memory 38. A list of character images saved in the front DB area of the flash memory 38 can be displayed. The user can select any of the character images, and copy the selected character image to the memory 752 of a controller 7a. In this case, as illustrated in FIG. 8, back character images saved in the back DB 339 of the game machine A are copied to the memory 752 of the controller 7a of the user A. In this case, a portion of the back character images may be randomly selected, and the selected image may be copied. Alternatively, of the character images saved in the front DB area, character images which have not been selected by the user may be copied to the memory 752 of the controller 7a. Also in this case, a portion of the character images which have not been selected by the user may be randomly selected and copied.

Next, the user A goes to the house of its friend (hereinafter referred to as a user B), carrying the controller 7a. Thereafter, the controller 7a of the user A is connected to a game apparatus main body 3b (hereinafter referred to as a game machine B) of the user B so that the user A plays, for example, a tennis game (a game program 332 described below; the game program is stored on the optical disc 4 or in the flash memory 38) with the user B. In the tennis game, a character object having a front character image possessed by each user is used as a player object of the user. In this case, by the CPU 30 executing a command included in the game program, three character images in the controller 7a of the user A are automatically copied to the back DB 339 of the game machine B as illustrated in FIG. 9. Specifically, for example, the automatic copying process is executed during the startup of the game program, or the automatic copying process is executed in a program routine of the game program in which the user selects a front character image. Note that, when the game program is executed by the CPU 30, a list of character image data in the front character database of the flash memory 38 is displayed, the user is caused to select desired character image data from the list based on an operation of the controller 7, and a player character object (a character object operated based on an operation of the controller 7) is displayed using the selected character image data. Also, character image data randomly selected from character image data in the back character database of the flash memory 38 is used to display a non-player character object (a character object operated by a computer control).

Thereafter, even after the user A leaves the user B's house, the character images copied from the user A's controller 7a remain in the back DB 339 of the game machine B as illustrated in FIG. 10. Thereafter, when the user B plays the tennis game by itself alone using the game machine B, objects for which the three character images of the user A are used appear as non-player characters, such as spectators, in the game screen.

Thus, in this exemplary embodiment, the number of back character images created by others can be increased without the user intentionally performing an operation for transfer and registration. As a result, a character object for which a character image created by another user is utilized can be caused to appear in a game. Thereby, for example, when the user A creates a character image resembling its face, a character object having a face resembling the face of a friend (the user A) of the user B stealthily appears in a game, thereby making it possible to enhance the enjoyment of the game.

Next, a game process executed by a game apparatus main body 3 will be described in detail. Firstly, data stored in the memory 752 of a controller 7 and the flash memory 38 and the main memory 33 of the game apparatus main body 3 during the game process will be described.

Figure 11:
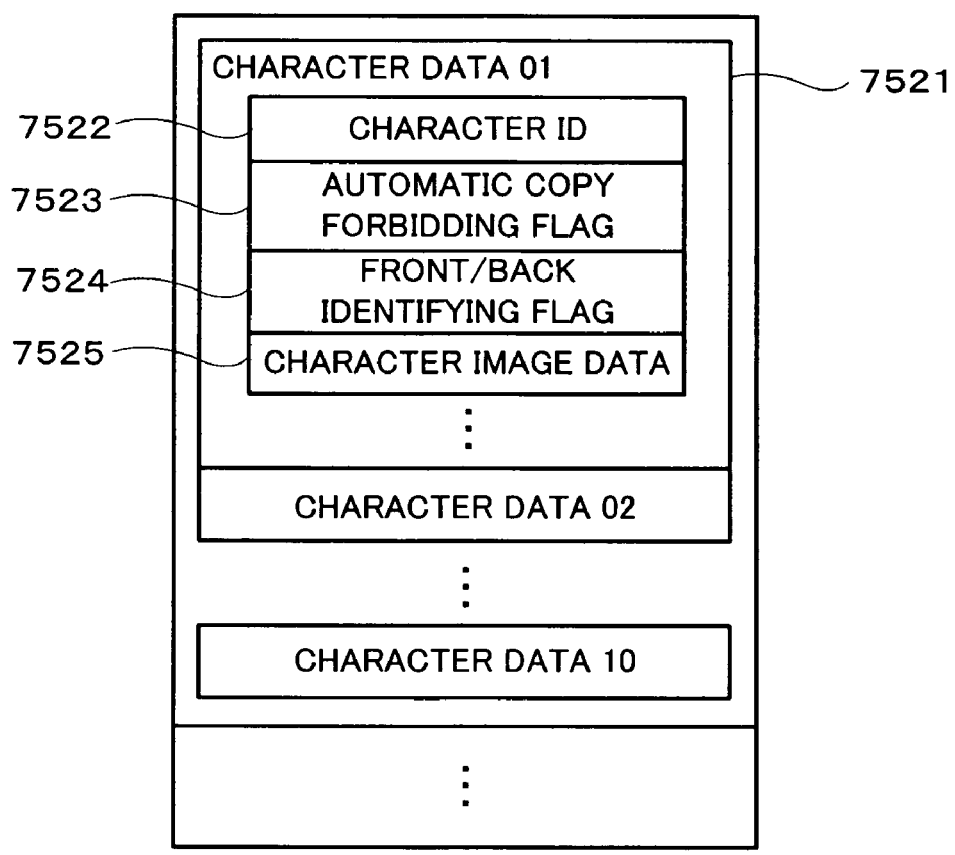
FIG. 11 is a diagram illustrating a memory map of a memory 752 of the controller 7.

FIG. 11 is a diagram illustrating a memory map of the memory 752 of the controller 7. As illustrated in FIG. 11, a maximum of 10 pieces of character data 7521 are stored in the memory 752. Each piece of character data 7521 stores a character ID 7522, an automatic copy forbidding flag 7523, a front/back identifying flag 7524, character image data 7525, and the like. The character ID 7522 is a unique ID assigned during creation of each character. Specifically, when a character image is created by the editor application, the ID is generated by the CPU 30 executing the editor application based on identification information about the game apparatus main body 3 executing the editor application and a counter (a value of the counter is stored in the flash memory 38) which is incremented every time a character image is created in the game apparatus main body 3 (typically, the ID is the identification information+the counter value). In addition, a value of a timer (not shown) included in the game apparatus main body 3 may be used, and the ID may also be based on the timer value when the character image is created by the editor application. Thereby, each character image is assigned a unique ID. The automatic copy forbidding flag 7523 is a flag for indicating whether or not copying is permitted for each character image. The front/back identifying flag 7524 is a flag for identifying whether each piece of character data is of front character or back character (more specifically, a character image stored in the front DB area of the flash memory 38 of a destination game apparatus main body 3 is added with a flag indicating that the character image is of front character, by the CPU 30 executing the transfer program, before being transferred to the memory 752 of a controller 7, and a character image stored in the back DB area of the flash memory 38 of a sender game apparatus main body 3 is added with a flag indicating that the character image is of back character before being transferred to the memory 752 of a controller 7). The image data 7525 is a specific image data of each character image.

The memory 752 also stores data required for various processes, such as data relating to communication with a game apparatus main body, in addition to the above-described various data.

Figure 12:
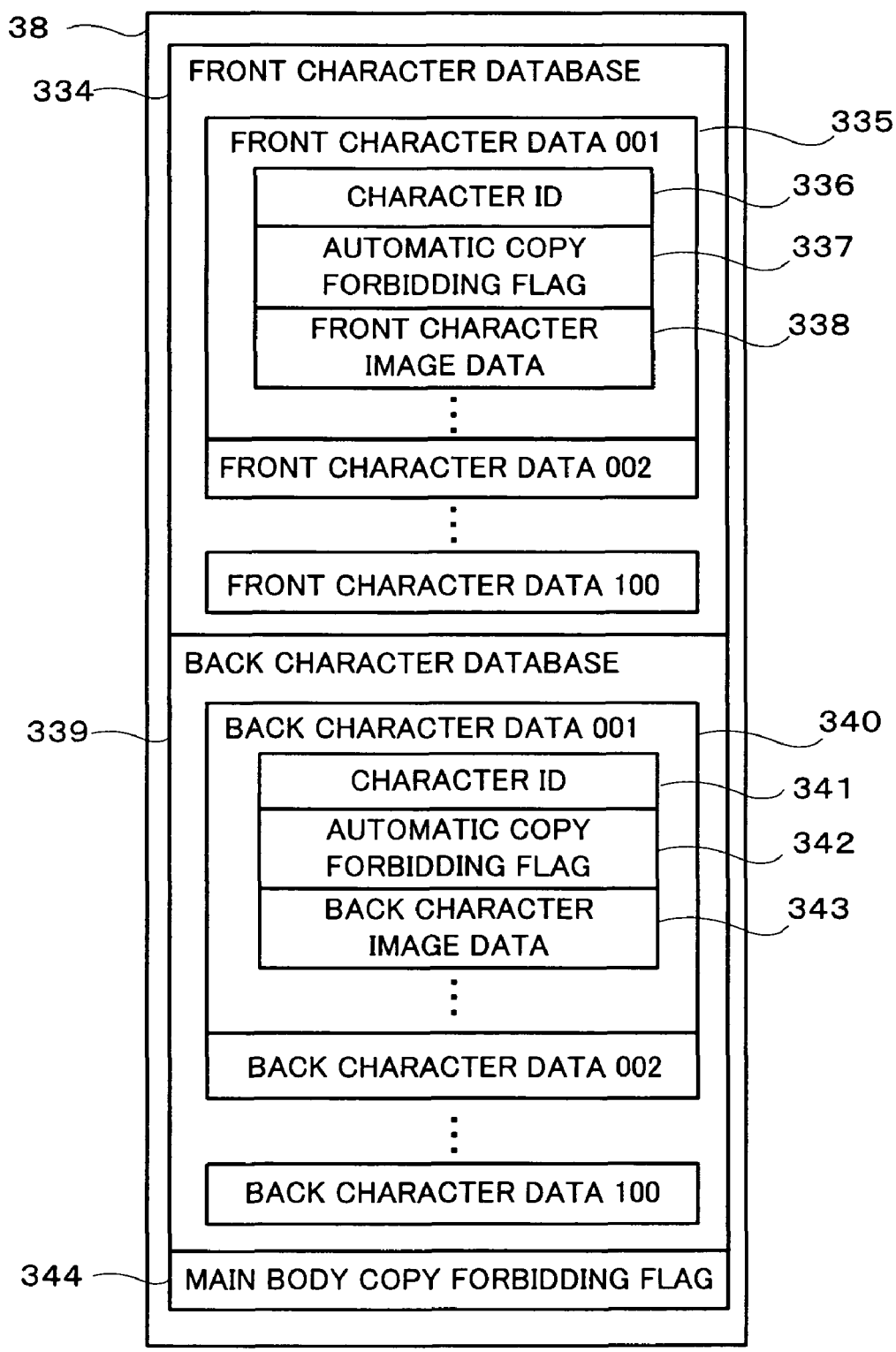
FIG. 12 is a diagram illustrating a memory map of a flash memory 38 of the game apparatus main body 3.

FIG. 12 is a diagram illustrating a memory map of the flash memory 38 of the game apparatus main body 3. The flash memory 38 stores the front DB 334, the back DB 339, and a main body copy forbidding flag 344.

The front DB 334 stores front character data 335 for 100 characters. Each piece of front character data 335 includes a character ID 336, an automatic copy forbidding flag 337, a front character image data 338, and the like. The character ID 336 is a unique ID assigned when each character is created. The automatic copy forbidding flag 337 is a flag for indicating whether or not copying is permitted for each character image. The front character image data 338 is specific image data for each front character image.

The back DB 339 stores back character data 340 for 100 characters. As with the front character data 335, each piece of back character data 340 includes a character ID 341, an automatic copy forbidding flag 342, back character image data 343, and the like. These contents are similar to the above-described front character data 335 and will not be described.

The main body copy forbidding flag 344 is a flag for indicating whether or not a transfer process itself is permitted for each character image. The game apparatus main body 3, when the flag is ON, does not perform automatic transfer of a character image (transfer can be manually performed by the user). This flag is set to be ON or OFF, depending on a setting by the user. Note that the main body copy forbidding flag 344 and a process based on the flag may be removed.

Figure 13:
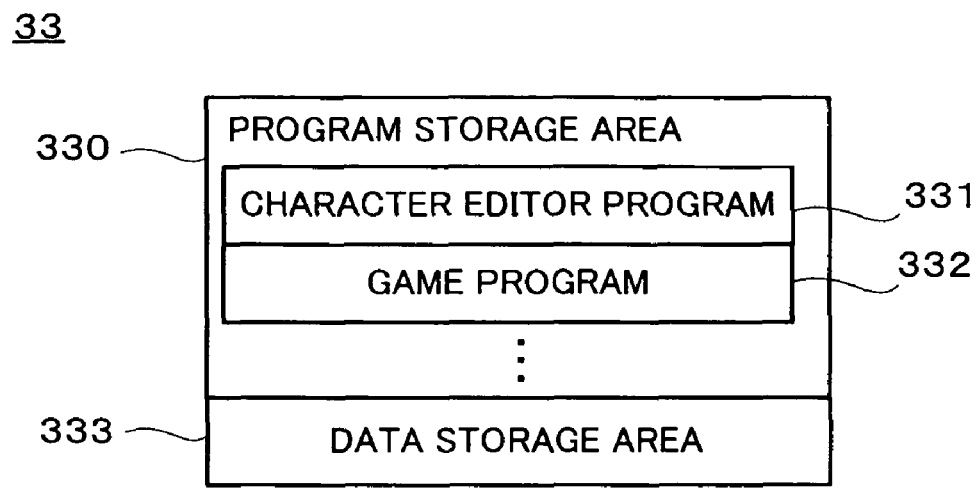
FIG. 13 is a diagram illustrating a memory map of a main memory 33 of the game apparatus main body 3.

FIG. 13 is a diagram illustrating a memory map of the main memory 33 of the game apparatus main body 3. The main memory 33 includes a program storage area 330 and a data storage area 333.

The program storage area 330 is an area in which a program stored on the optical disc 4 or a program in the flash memory 38 is loaded. This area stores various programs which are executed by the CPU 30, such as a character editor program 331, a game program 332, and the like. The character editor program 331 is a program for mainly creating game data based on a user's operation, and which causes the CPU 30 to execute the following functions:

creating game data (character image data) based on a user's operation, and storing the game data into the flash memory 38;

moving or copying a desired piece of game data of pieces of game data stored in the flash memory 38 of the game apparatus main body 3, to the memory 752 of the controller 7 based on a user's operation;

moving or copying a desired piece of game data of pieces of game data stored in the memory 752 of the controller 7, to the flash memory 38 of the game apparatus main body 3 based on a user's operation;

moving or copying game data stored in the flash memory 38 of the game apparatus main body 3 to the memory 752 of the controller 7 irrespective of a user's operation; and moving or copying game data stored in the memory 752 of the controller 7 to the flash memory 38 of the game apparatus main body 3 irrespective of a user's operation.

The game program 332 is a program for executing a process for a game play using game data created by the character editor program, and which causes the CPU 30 to execute the following functions:

executing the process for the game play using game data stored in the flash memory 38 of the game apparatus main body 3 or the memory 752 of the controller 7, and using operational information about the controller 7;

copying game data stored in the flash memory 38 of the game apparatus main body 3 to the memory 752 of the controller 7 irrespective of a user's operation; and copying data stored in the memory 752 of the controller 7 to the flash memory 38 of the game apparatus main body 3 irrespective of a user's operation.

Note that, typically, either the character editor program 331 or the game program 332 is selectively stored into the main memory 33.

The character editor program 331 is a program corresponding to the character editor for creating, editing, and transferring a character. The character editor executed by the program includes four processing modes: a create mode; an edit mode; a view mode; and a transfer mode. In the create mode, the user can create a character image. In the edit mode, a character image created by the user can be edited or deleted. In the view mode, a character image saved in the front DB 334 and the back DB 339 can be viewed and deleted. In the transfer mode, a character image can be transferred (moved or copied) between the controller 7 (the memory 752) and the game apparatus main body 3 (the flash memory 38) by a process described below.

The game program 332 is a program for executing a game process using a character image created by the character editor.

Character data stored in the flash memory 38 is copied to the data storage area 333 as required by a game process or the like. In addition, the data storage area 333 stores data required for various processes, such as data relating to an edit process or a virtual game space (image data, etc), and the like.

Figure 14:
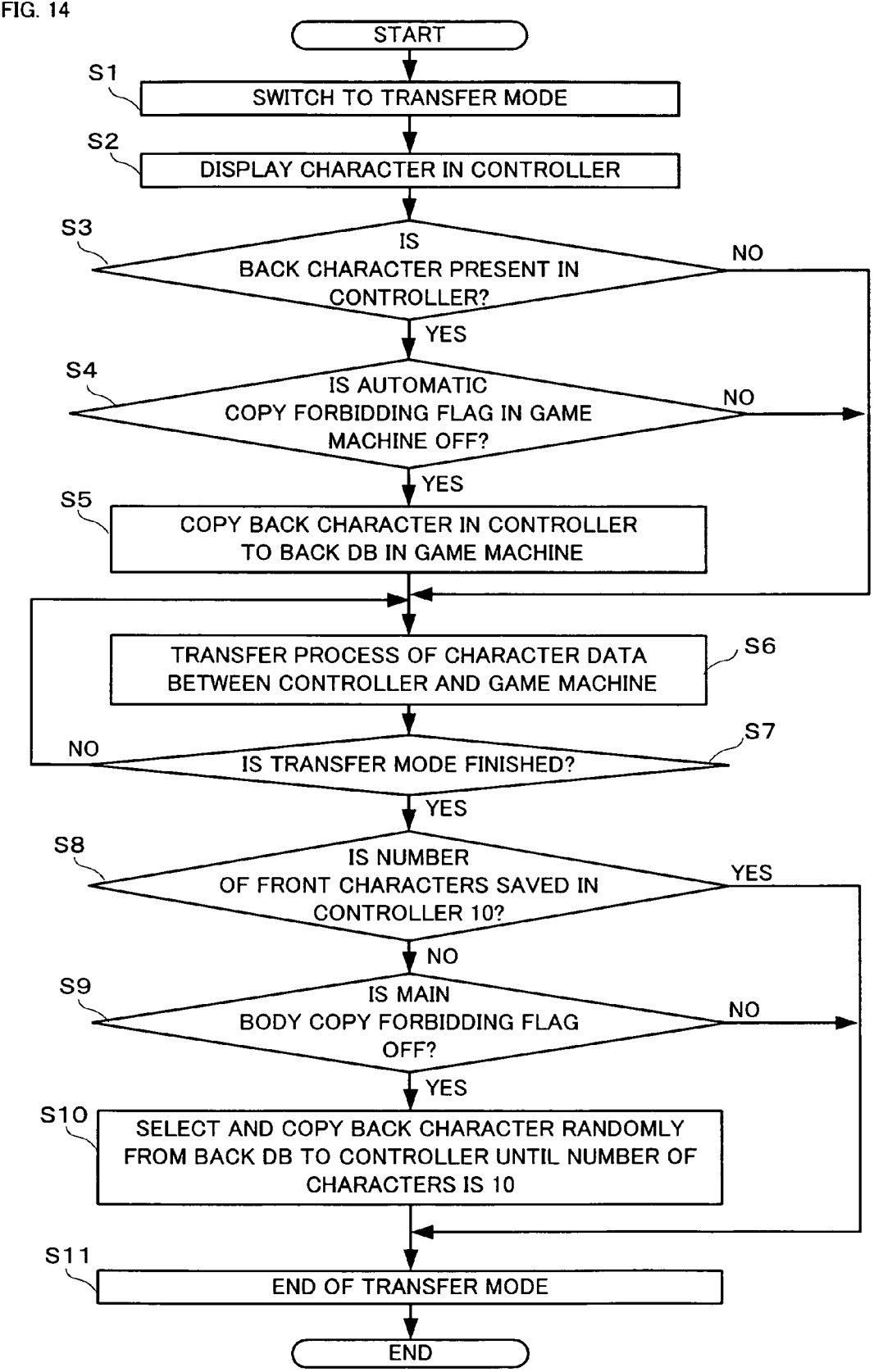
FIG. 14 is a flowchart illustrating a character data transferring process of a character editor.

Next, a character data transferring process executed by the game apparatus main body 3 will be described with reference to FIGS. 14 and 15. Note that FIG. 14 is a flowchart illustrating the character data transferring process of the character editor. The flowchart illustrates a flow of a process performed by the CPU 30 executing the character editor program. For the sake of convenience, it is here assumed that a character image has been created by the character editor and is stored in the front DB 334. It is also assumed that back character images for several characters are already stored in the back DB 339.

A process of creating a character image in the character editor will be briefly described. The character editor program stores a plurality of pieces of basic-part image data for each part. Specifically, a plurality of facial contour images, a plurality of mouth images, a plurality of eye images, (basic-part image data) are stored. Based on the basic-part image data, a list of the basic-part images is displayed on the monitor. The user operates the operation section 72 to select image data for each part from the list based on the operational information, and combine the selected pieces of image data for parts to generate a character image.

Initially, the CPU 30 executes a process for establishing a communication link with the controller 7. Thereafter, in the game apparatus main body 3, the CPU 30 starts up the character editor based on a user's instruction, and goes to the transfer mode (step S1). Next, the CPU 30 reads only front character data (the front/back identifying flag 7524 indicates that the data is of front character) of the character data stored in the memory 752 of the controller 7, and displays the character image on the screen (step S2). Note that, when no character data is stored in the memory 752 of the controller 7, a message indicating such matter is displayed on the screen.

Next, the CPU 30 references the front/back identifying flag 7524 of each piece of character data of the controller 7 to determine whether or not a back character is present (step S3). As a result of the determination, when a back character is present in the controller 7 (YES in step S3), it is determined whether or not the main body copy forbidding flag 344 of the game apparatus main body 3 is OFF (step S4). As a result, if the main body copy forbidding flag 344 is OFF, automatic copying to the main body 3 is permitted, and back character data (the front/back identifying flag 7524 indicating that the data is of back character) in the controller 7 is copied to the back DB 339 of the flash memory 38 of the game apparatus main body 3 (step S5). More specifically, the CPU 30 transmits a request for transmission of the back character data via the communication unit 6 to the controller 7. In response to this, the controller 7 transmits the back character data to the game apparatus main body 3. The CPU 30 receives and writes the data into the back DB 339. By the process of step S5, the character data in the controller 7 is transferred to the game apparatus main body 3 irrespective of the presence or absence of a user's operation. Note that the character data of the controller 7 may be transferred and written into the game apparatus main body 3 no matter whether the character data is of front character or a back character.

Next, based on a user's operation, a process of transferring a front character between the controller 7 and the game apparatus main body 3 is performed (step S6). Specifically, based on a user's operation, character data desired by the user is selected and moved from the controller 7 to the game apparatus main body 3, and character data is moved from the game apparatus main body 3 to the controller 7. Initially, data stored in all areas of the memory 752 of the controller 7 is transferred to the main memory 33 of the game apparatus main body 3. Specifically, the game apparatus main body 3 transmits control data which instructs the controller 7 to transfer all data in the memory 752. In response to this, the data is transferred from the controller 7 and is stored into a predetermined area (hereinafter referred to as a "copy area") of the main memory 33. Next, the game apparatus main body 3 references the copy area to display a character image list A on the monitor based on character data for which a value indicating "front character" is set in the front/back identifying flag, of the character data stored in the copy area. Thereafter, a process of selecting desired character data from the character image list A is executed by, for example, moving a cursor, depending on an operation of the operation section 72 of the controller 7. Thereafter, the selected character data is stored into a free area in the front character database of the flash memory 38, and the character data is erased from the copy area. Also, the game apparatus main body 3 displays a character image list B on the monitor based on the character data of the front character database of the flash memory 38. Thereafter, a process of selecting desired character data from the character image list B is executed, depending on an operation of the operation section 72 of the controller 7. Thereafter, the selected character data is stored into a free area of the character data area of the copy area (in this case, a value indicating "front character" is set in the front/back identifying flag), and is erased from the front character database of the flash memory 38. After the selection is finished, the data in the copy area is transferred to the controller 7, so that all areas of the memory 752 of the controller 7 are overwritten with the data.

Also, in this example, a plurality of controllers 7 can be simultaneously communication-linked to the game apparatus main body 3, and the move process may be executable between the currently connected controllers 7 (the memories 752) and the game apparatus main body 3 (the flash memory 38). Specifically, when there are two currently connected controllers 7a and 7b, the move process may be executed between the memory 752 of the controller 7a and the flash memory 38 and between the memory 752 of the controller 7b and the flash memory 38. In this case, the move process may be executed with respect to the connected controllers 7 either one by one (method 1) or simultaneously (method 2).

In the method 1, initially, a controller 7 to be subjected to the move process is selected from the currently connected controllers 7 on the monitor (e.g., the selection is performed based on operational information from a specific controller (e.g., a controller having a channel number 1) of the currently connected controllers 7). The channel number of the selected controller 7 is stored into the main memory 33 ("selected channel number data" (not shown)). Next, the selected channel number data and the channel setting area are referenced, and control data for transferring data stored in all areas of the memory 752 is transmitted to the controller 7 indicated by the selected channel number data. In response to this, data in the memory 752 is transferred from the controller 7 into the copy area of the main memory 33. Next, the game apparatus main body 3 executes the move process while referencing the copy area. In this case, when a process of selecting a desired character image from a character image list is executed, the selection may be performed based on operational information from a specific controller (e.g., the controller having the channel number 1) of the connected controllers 7, or alternatively, the selection may be performed based on operational information from the controller 7 indicated by the selected channel number data (operational information having a connection handle corresponding to a channel number indicated by the selected channel number data). After the selection is finished, the data in the copy area is transferred to the controller 7 designated by the selected channel number data, so that all areas of the memory 752 of the controller 7 is overwritten with the data.

In the method 2, control data for transferring data in all areas of the memory 752 is transmitted to all of the connected controllers 7. In response to this, data in the memory 752 of each controller 7 is transferred and stored into the copy area of the main memory 33. In this case, the copied data of the memory 752 received from each controller 7 is added with the channel number of the controller 7, and the resultant data is stored. Specifically, data in the channel setting area is referenced, a connection handle added to data received from each controller 7 is converted into a channel number, the channel number is added to the data, and the resultant data is stored into the copy area of the main memory 33. In other words, for each of the connected controllers 7, the copied data of the memory 752 of the controller 7 and the channel number of the controller 7 are stored into the copy area of the main memory 33. Note that, instead of the channel number, the identification information (e.g., Bluetooth®) or the connection handle of the controller 7 may be added. Next, the game apparatus main body 3 references the copy area to execute the move process (character image lists of the connected controllers 7 may be displayed either one by one or simultaneously). In this case, when a process of selecting a desired character image from a character image list is executed, the selection may be based on operational information from a specific controller (e.g., the controller having the channel number 1) of the connected controllers 7. When a desired character image is selected from a character image list based on copied data added with the channel number of a controller 7 of the connected controller 7, the selection may be based on operational information about the controller 7. After the selection is finished, the copied data of the copy area, each piece of which is added with a channel number, is transmitted to controllers 7 corresponding to the respective channel numbers. Specifically, there are two linked controllers 7a and 7b, and the controller 7a has a channel number of 1 and the controller 7b has a channel number of 2. Copied data a received from the controller 7a is added with the channel number 1 and the resultant data is stored into the copy area, while copied data b received from the controller 7b is added with the channel number 2 and the resultant data is stored into the copy area. Thereafter, a character image list a is displayed based on the copied data a, and a character image list b is displayed based on the copied data b, on the monitor. Thereafter, selection is performed with respect to the character image list a based on operational information received from the controller 7a, while selection is performed with respect to the character image list b based on operational information received from the controller 7b (selection may be performed with respect to the character image list b based on operational information received from the controller 7a). Thereafter, the updated copied data a is transferred to the controller 7a corresponding to the channel number 1, while the updated copied data b is transferred to the controller 7b corresponding to the channel number 2.

Note that, in this example, data in the memory 752 of the controller 7 is previously copied into the main memory 33, and the copied data is used to execute the above-described process, taking into consideration the load of wireless communication. However, as another example, when data in the memory 752 of the controller 7 is required for a process in the game apparatus main body 3, an address for the required data may be designated to issue a transfer request.

Here, for front characters, when character data is transferred from the controller 7 (the memory 752) to the game apparatus main body 3 (the flash memory 38), a "move" process is performed, but not a "copy" process. Also, assuming that a front character is moved from the controller 7 to the game apparatus main body 3 in response to a user's operation, when a character having the same ID as the character ID of the front character to be moved is present in the back DB 339 of the flash memory 38, character data having the ID is deleted from the back DB 339. In other words, there are no two characters having the same ID between the front DB 334 and the back DB 339. Also, when a front character is moved from the game apparatus main body 3 to the controller 7, the user can set the automatic copy forbidding flag 337 to be ON. Note that, when the main body copy forbidding flag 344 is ON, the automatic copy forbidding flag 337 is invariably set to be ON.

Next, the CPU 30 determines whether or not the user has issued an instruction to end the transfer mode (step S7). As a result of the determination, if the end instruction has been issued (YES in step S7), then the CPU 30 determines whether or not the number of pieces of front character data saved in the controller 7 is 10 (step S8). If the number is 10 (YES in step S8), the CPU 30 ends the transfer mode without a further process (step S11).

On the other hand, if the number of front characters in the controller 7 is not 10 (NO in step S8), the game apparatus main body 3 determines whether or not the main body copy forbidding flag 344 is OFF so as to determine whether or not character copying is permitted (step S9). As a result of the determination, if the flag is OFF, i.e., copying is permitted (YES in step S9), piece(s) of back character data 340, the number of which is (10—the number of front characters), are randomly selected from the back DB 339 of the flash memory 38, the front/back identifying flag is set to be a value indicating "back character", and the copied data in the main memory 33 is updated (thereafter, the copied data is transferred to the controller 7, and the controller 7 stores the transferred data into the memory 752) (step S10). In this case, overwrite copying is performed with respect to a back character(s) which is already stored in the memory 752 of the controller 7. When copying of the back characters is finished, the CPU 30 ends the transfer mode.

On the other hand, as a result of the determination in step S9, when the main body copy forbidding flag 344 is ON (NO in step S9), automatic copying is forbidden, so that the CPU 30 ends the transfer mode without copying a back character (step S11). Thus, when the user performs a front-character transferring operation in the character editor, a back character (s) is also automatically copied to the controller 7. Thus, the character data transferring process by the character editor is completed.

Next, a character image transferring process when a game process (a process executed based on the program 332) is executed by the game apparatus main body 3, will be described. Note that FIG. 15 is a flowchart illustrating the character image transferring process when the game process is executed by the game apparatus main body 3.

Figure 15:
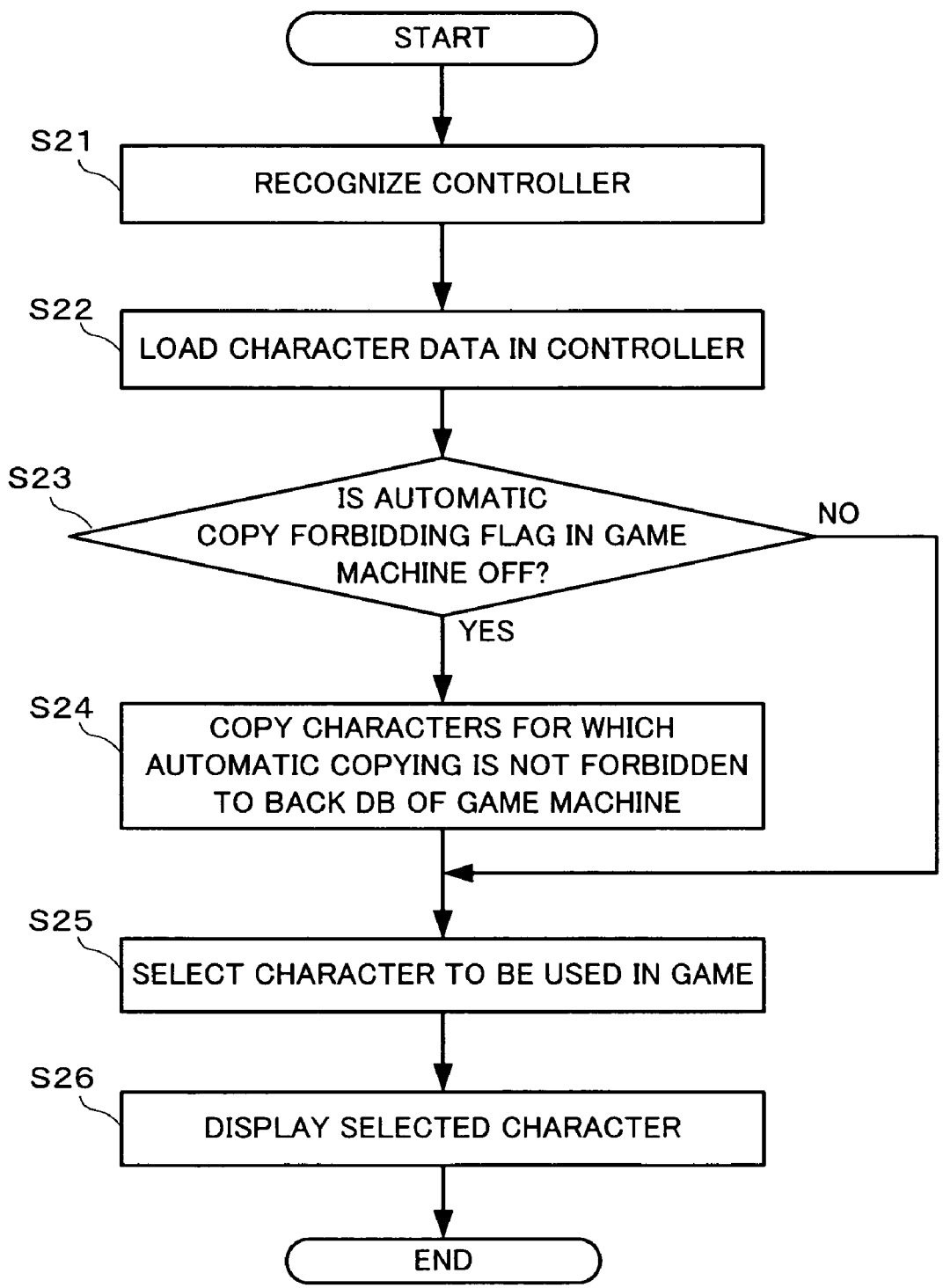
FIG. 15 is a flowchart illustrating a character image transferring process when a game process is executed.

For the process of FIG. 15, it is assumed that a user A who has saved a character image as a front character into a controller 7 by the above-described process, goes to the house of its friend (a user B), carrying the controller 7. Thereafter, in a game apparatus main body 3 possessed by the user B, a game which employs character images (hereinafter referred to as a "character image supporting game") is started up so as to execute the process of FIG. 15. FIG. 15 illustrates a flow of a process executed by the CPU 30 executing the program 332.

Initially, when the character image supporting game is started up, the CPU 30 executes a process of establishing a communication link with the controller 7 (step S21). Specifically, since a controller identification (hereinafter referred to as a controller ID) which is set in each controller 7 is transmitted to the communication unit 6, the controller ID can be used to recognize and identify a controller of each user. It is here assumed that a controller 7a of the user A and a controller 7b of the user B are recognized.

Next, the CPU 30 reads character data saved in each controller (step S22). Specifically, the CPU 30 transmits, to a controller 7 having a connection handle corresponding to each channel number, control data for transferring character data in the memory 752 of the controller 7, and thereafter, receives the character data from the controller 7. Thereafter, the CPU 30 adds to the received character data the channel number through which the character data has been received, and stores the resultant data into a predetermined area of the main memory 33.

It is here assumed that character data is read from the controller 7a of the user A. Specifically, character data corresponding to 10 characters which is stored in the controller 7a are read into the main memory 33.

Next, the CPU 30 determines whether or not the main body copy forbidding flag 344 is OFF (step S23). As a result, if the flag is OFF, i.e., copying is permitted (YES in step S23), only character data for which the automatic copy forbidding flag 337 is OFF of the character data of the controller 7a which has been read in the main memory 33, is copied into the back DB 339 of the flash memory 38. In other words, only a character (s) in the controller 7a for which copying is permitted is copied into the back DB 339 of the game machine no matter whether it is a front character or a back character. On the other hand, when the main body copy forbidding flag 344 is ON (NO in step S23), automatic copying is forbidden in the game apparatus main body 3 of the user B, so that copying from the controller 7a is not executed. The CPU 30 causes the process to go to the next step S25.

If reading or copying of character data from the controller 7 is finished, then the CPU 30 uses a character image of each piece of character data to display a screen for selecting a character to be used in a game (step S25). Note that, here, the user can select only a character(s) stored in the front DB 334 of the game apparatus main body 3 of the user B and a front character(s) stored in the controller 7 of each user.

In this case, when a plurality of controllers 7 are connected, character selection screens for all of the connected controllers 7 may be displayed one by one (method 1) or simultaneously (method 2) so as to execute the selection process.

In the method 1, initially, a target controller 7 is selected from the connected controllers 7 on the monitor (e.g., the selection is performed based on operational information from a specific controller (e.g., a controller having a channel number 1) of the connected controllers 7). Alternatively, the connected controllers 7 may be selected successively. The channel number of the selected controller 7 is stored into the main memory 33 ("selected channel number data" (not shown)). Next, the selected channel number data and the channel setting area are referenced, and control data for transferring data stored in all areas of the memory 752 is transferred to a controller 7 indicated by the selected channel number data. In response to this, data in the memory 752 is transferred from the controller 7 into the copy area of the main memory 33. Next, the game apparatus main body 3 references the character data of a front character(s) stored in the copy area and the character data of a front character(s) stored in the flash memory 38 to display a character image list of these characters, and executes a process of selecting a desired character image from the character image list based on operational information from the controller 7 indicated by the selected channel number data (operational information having a connection handle corresponding to a channel number indicated by the selected channel number data). After the selection is finished, the selected character data is set as character data corresponding to the selected channel number data (not shown; the set information is stored in the main memory 33).

In the method 2, control data for transferring data in all areas of the memory 752 is transmitted to all of the connected controllers 7. In response to this, data in the memory 752 of each controller 7 is transferred and stored into the copy area of the main memory 33. In this case, the copied data of the memory 752 received from each controller 7 is added with the channel number of the controller 7, and the resultant data is stored. Specifically, data in the channel setting area is referenced, a connection handle added to data received from each controller 7 is converted into a channel number, and the channel number is added to the data. In other words, for each of the connected controllers 7, the copied data of the memory 752 of the controller 7 are stored, along with the channel number of the controller 7, into the copy area of the main memory 33. Next, the game apparatus main body 3 references the copy area to execute the character selecting process (the character image lists of the connected controllers may be displayed either one by one or simultaneously). In this case, when a process of selecting a desired character image from a character image list is executed, the selection may be performed with respect to a character image list based on copied data added with a channel number of a controller 7 of the connected controllers 7, based on operational information from the controller 7. The selected character data is set as character data corresponding to each channel number (not shown; the set information is stored in the main memory 33).

Specifically, there are two connected controllers 7a and 7b, and the controller 7a has a channel number of 1 and the controller 7b has a channel number of 2. Copied data a received from the controller 7a is added with the channel number 1 and the resultant data is stored into the copy area, and copied data b received from the controller 7b is added with a channel number 2 and the resultant data is stored into the copy area. Thereafter, a character image list a is displayed based on the copied data a, and a character image list b is displayed based on the copied data b, on the monitor. Thereafter, selection is performed with respect to the character image list a based on operational information received from the controller 7a, while selection is performed with respect to the character image list b based on operational information received from the controller 7b. A setting indicating that the character data selected from the character image list a is of the controller 7a (channel number 1) is stored in the main memory 33, and a setting indicating that the character data selected from the character image list b is of the controller 7b (channel number 2) is stored in the main memory 33.

Thereafter, when a game is started, a character selected by each user is displayed on a game screen, and a game process (e.g., a tennis game) is executed (step S26). Thus, the character data transferring process of the first exemplary embodiment is completed. More specifically, the game process is executed using character data which is set as character data corresponding to the channel numbers 1 and 2, based on operational information about the controllers 7 assigned the channel numbers 1 and 2. Even more specifically, character images set as character data corresponding to the channel numbers 1 and 2 are used to display respective player objects in a virtual space, and motions of the player objects are controlled based on operational information about the controllers 7 assigned the channel numbers 1 and 2.

Thus, in the first exemplary embodiment, a front character created by the user A is automatically stored as a back character via the controller 7 into the game apparatus main body 3 of the user B. Further, a back character created by another user is also copied via the controller 7 to a game apparatus main body of still another user. For example, a front character created by the user A is copied via the controller 7 of the user A to the back DB of the game apparatus main body 3 of the user B. Next, when the user B saves a front character created by itself into the controller 7, a character created by the user A is also saved as a back character into the controller 7. Thereafter, if the user B links its own controller 7 to a game apparatus main body of a user C, characters created by the users A and B are automatically copied as back characters to a back DB of the user C. Thus, by linking a controller 7 to a game apparatus main body 3 of another user, characters created by one user or other users are copied to another game apparatus main body. The user can feel as if back characters were proliferating, without being aware of it. By applying the character images of these back characters to characters appearing in a game, the character images having various individual features created by users can be displayed in the game, thereby making it possible to provide novel enjoyment of a game by communication with others.

Note that, in the exemplary embodiment above, character data is transferred from a controller 7 to a game apparatus main body 3 using a dedicated editor application (character editor). Transfer may be performed without such a dedicated application or a user's transfer instruction. For example, a resident transfer program may be provided on background in a game apparatus main body 3, and a transmission request signal may be regularly transmitted to a controller 7. In response to this request, character data may be transferred from the controller 7 to the game apparatus main body 3 (all pieces of character data stored in the memory 752 of the controller 7 may be transferred, only a front character(s) may be transferred, or only a back character(s) may be transferred). The character data transferred from the controller 7 is stored into a back character area of the flash memory 38. Thereby, a back character can be transferred without a particular operation by the user.

As a part of the startup process of a game apparatus main body 3, character data may be transmitted and received between the flash memory 38 of the game apparatus main body 3 and the memory 752 of a controller 7. Specifically, identification information about the linked controller 7 is stored in a non-volatile manner, and during a boot-up process when the game apparatus main body 3 is powered ON, a link to the controller 7 stored in a non-volatile manner is established, and then the transmission request is transmitted to the controller 7. In response to this, character data may be transmitted from the controller 7 to the back DB 339. Thereafter, when copying to the back DB is finished, then piece(s) of back character data, the number of which is (10—the number of front characters), may be randomly selected and overwrite-copied from the game apparatus main body 3 to the controller 7. Thereby, after the game apparatus main body 3 is started up, a back character newly added can be quickly reflected and displayed in a predetermined game process or the like.

With timing of the controller 7 being connected to the game apparatus main body 3, the transmission request may be transmitted from the game apparatus main body 3. Since connection is established via radio waves in this exemplary embodiment, the above-described transfer process may be executed when a link is established between the game apparatus main body 3 and the controller 7. If a controller is of a wired-connection type, the above-described transfer process may be executed when physical connection is established. Thereby, user's convenience can be improved.

Also, even when the character editor is not used, character data may be transferred in response to a user's operation of issuing an instruction to transfer character data in, for example, the character selection screen in a game process (the process of step S25 in FIG. 15). Further, in this case, if a plurality of controllers 7 are connected, a transfer process may be executed only for a controller(s) 7 with which the transfer instructing operation has been executed. For example, it is assumed that three controllers 7a, 7b and 7c are connected to a game apparatus main body 3. Assuming that the controller 7b issues a transfer instruction as described above, front character data and back character data may be transmitted and received only with respect to the controller 7b, and character data may not be transmitted or received with respect to the other controllers. Thereby, character data can be transmitted and received based on user's intention.

Also, assuming that character data in a controller 7 is moved or copied to the flash memory 38, if a plurality of pieces of character data are already saved in the controller 7, any piece(s) of the character data may be selected by the user before being moved or copied. Note that the selected character data is stored as a front character into the flash memory 38. In this case, thereafter, character data including character data which has not been selected (may include a selected character) may be transferred and stored as a back character into the flash memory 38. Note that, in this case, the user may be able to select only a front character(s) in the controller 7. Also, assuming that character data in the flash memory 38 is moved or copied to the controller 7, if a plurality of pieces of character data are already saved in the flash memory 38, any piece(s) of the character data may be selected by the user before being moved or copied. Note that the selected character data is stored as a front character into the controller 7. In this case, thereafter, character data including character data which has not been selected (may include a selected character) may be transferred and stored as a back character into the controller 7. Note that, in this case, the user may be able to select only a front character(s) in the flash memory 38.

Further, the character editor may be provided with a function of deleting character data desired by the user of front characters in the flash memory 38. During execution of this function, when the user issues an instruction to delete a front character in the flash memory 38, the front character may be deleted from the front DB, and at the same time, the front character may be registered as a back character into the back DB 339. In other words, when a delete command is issued, a front character for which the deletion command has been issued may be moved into the back DB 339, instead of deletion from the front DB 334. Thereby, the number of back characters can be increased.

Second Exemplary Embodiment

Figure 16:
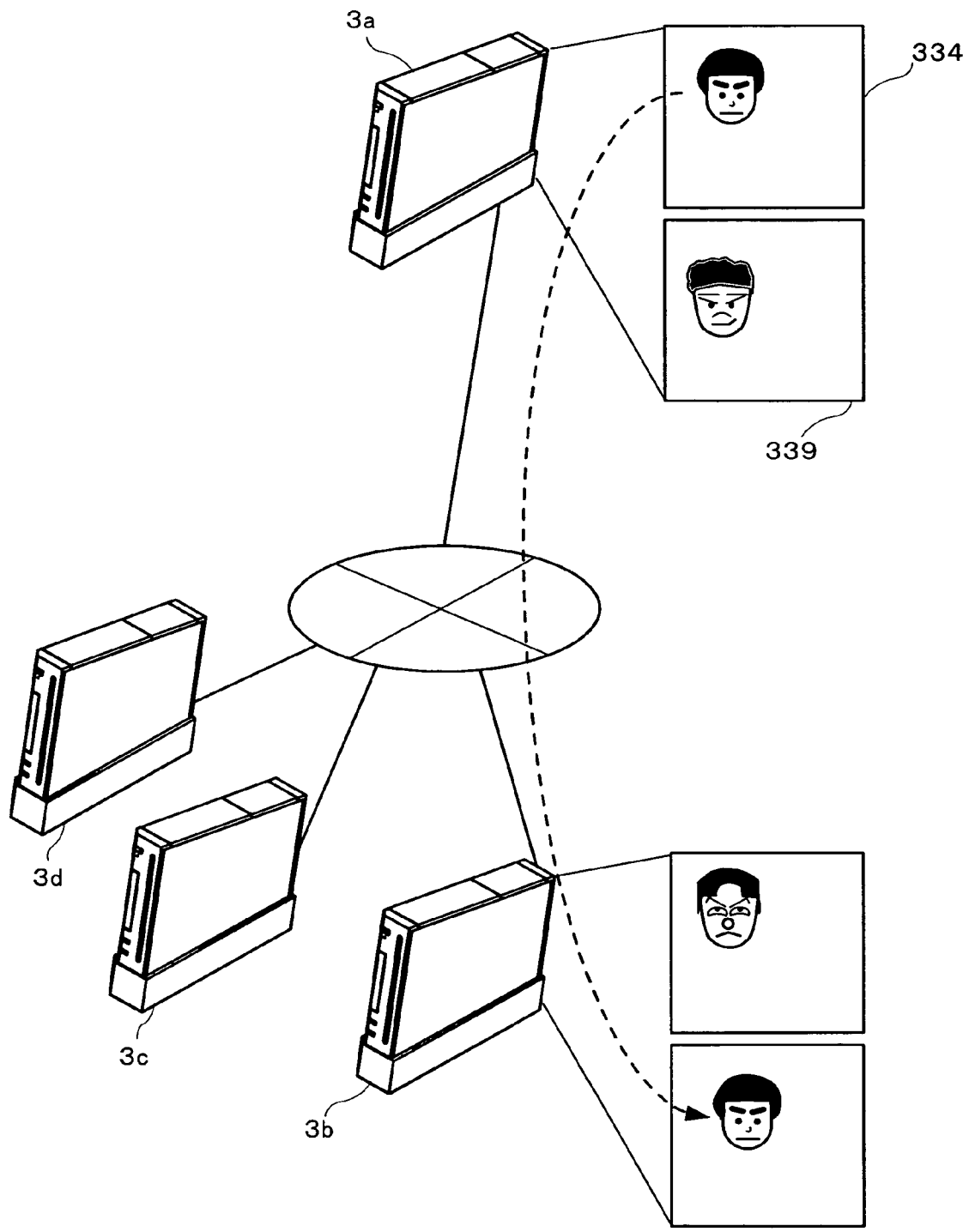
FIG. 16 is a diagram for describing an outline of a transfer process via a network according to a second exemplary embodiment.

Next, a second exemplary embodiment of certain exemplary embodiments will be described with reference to FIGS. 16 to 18. In the first exemplary embodiment above, character data is transferred via a controller to another game apparatus main body. In contrast to this, character data is transferred via a network in the second exemplary embodiment. Note that a continuous connection network is used in this example. Note that the game apparatus main body of this exemplary embodiment has a functional block diagram and a hardware configuration block diagram similar to those of the first exemplary embodiment (see FIGS. 1 to 7). Therefore, like parts are indicated by like reference numerals and will not be described in detail.

Firstly, a network environment according to the second exemplary embodiment will be described. In this exemplary embodiment, game apparatus main bodies are connected to each other via the continuous connection network. Each game apparatus main body 3 is operated 24 hours a day, including transition to a standby mode or the like.

The game apparatus main body 3 also has an electronic mail application (hereinafter referred to as a mail application) as a standard feature (the application program is stored in a non-volatile memory (e.g., the flash memory 38) of the game apparatus main body 3, and is executed by the CPU 30). In the mail application, a transmission destination can be selected from an address book saved in the game apparatus main body 3 (the flash memory 38) and an electronic mail can be transmitted to the destination. Note that the electronic mail is transmitted and received using, for example, a webmail system. In this mail application, character data (including at least a character ID and character image data) of a front character created by the user can be attached to a mail. For example, by attaching character data of a character image resembling the user, the user can send to others a mail to which a portrait of the user's face is attached.

Next, an outline of a transfer process assumed in this exemplary embodiment will be described with reference to FIG. 16. FIG. 16 is a diagram for describing the outline of the transfer process via a network which is assumed in this exemplary embodiment. In FIG. 16, game apparatus main bodies 3a to 3d are connected to each other via the network. Each game apparatus main body 3 has a front DB 334 and a back DB 339. It is here assumed that a user A possessing the game apparatus main body 3a transmits an electronic mail to a user B possessing the game apparatus main body 3b. In this case, the user A starts up the electronic mail application, and selects the user B as a destination address from address book data (hereinafter referred to as an address book) saved in the game apparatus main body 3a. Thereafter, the user A attaches to a mail a front character created as "facial portrait" by itself, and transmits the mail. Specifically, when the CPU 30 is caused to start up and execute the electronic mail application, a list of front characters stored in a front DB 334a is displayed on the monitor, based on data stored in the front DB 334a (character image data), desired data is selected from the displayed list based on operational information about the controller 7, and the selected character data is attached. In the game apparatus main body 3b, a mail receiving application (this application program is stored in a non-volatile memory (e.g., the flash memory 38) of the game apparatus main body 3, and is executed by the CPU 30) is started up, and the CPU 30 (or a sub-CPU (not shown)) executes the application, so that the mail is received and saved into a reception box (a reception box area is provided in the flash memory 38). Thereafter, when the user B starts up an electronic mail application and causes the CPU 30 to execute the application to open an electronic mail saved in a reception box, character data (a character image and a character ID of a "facial portrait") which has been attached to the electronic mail, is copied to the back DB 339b of the game apparatus main body 3b. Thus, when a character image of a front character is transmitted by an electronic mail, the front character is registered as a back character in a receiver, resulting in an increase in the number of back characters.

Figure 17:
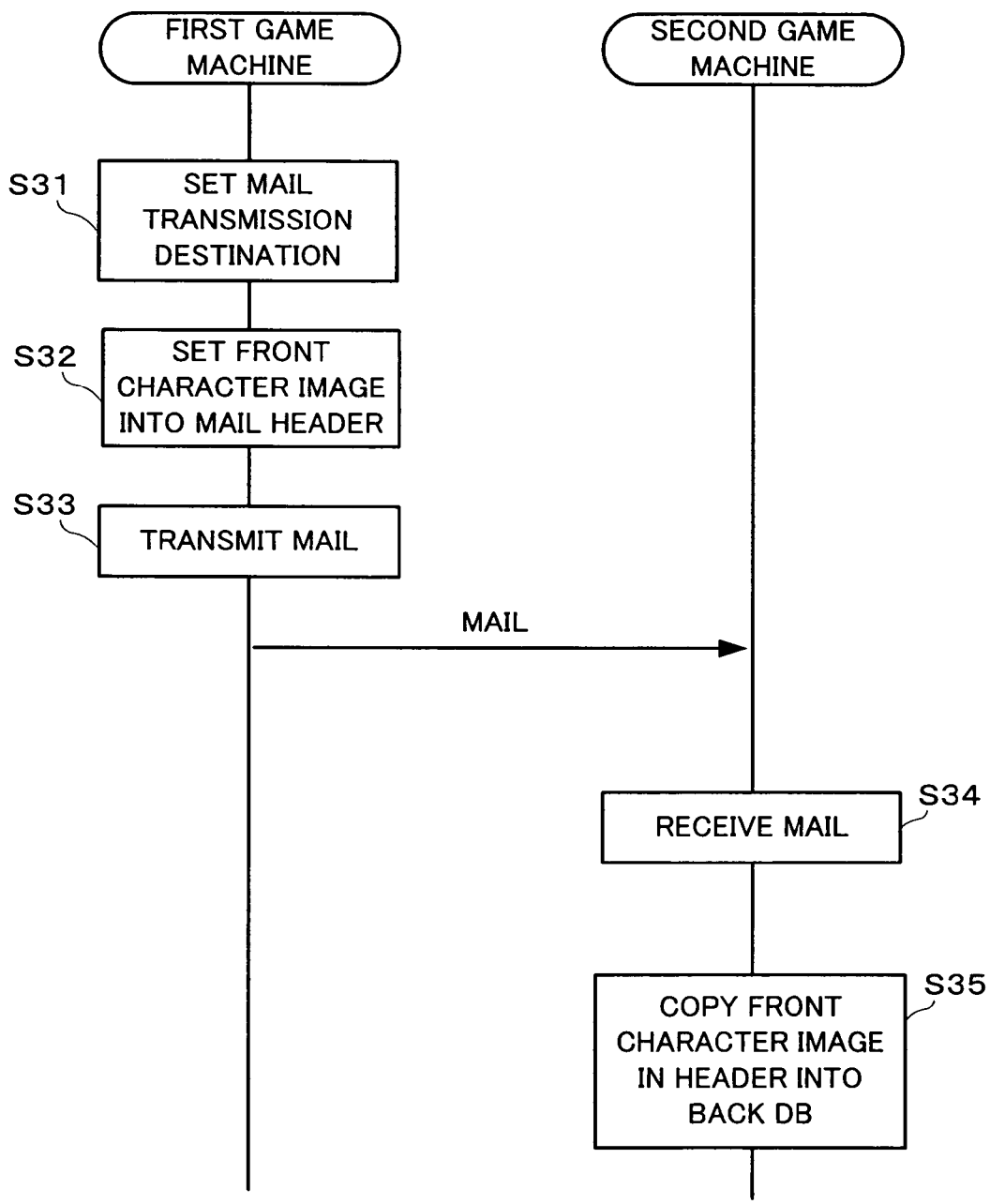
FIG. 17 is a flowchart illustrating a process of transferring character data according to the second exemplary embodiment.

FIG. 17 is a flowchart illustrating a process of transferring character data according to the second exemplary embodiment. In the flowchart, S31 to S33 indicate steps in which the electronic mail application is executed by the CPU 30 of the game apparatus main body 3a. S34 indicates a step in which the mail receiving application is executed by the CPU 30 (or a sub-CPU (not shown)) of the game apparatus main body 3b. S35 indicates a step in which the electronic mail application is executed by the CPU 30 of the game apparatus main body 3b.

Initially, in a first game apparatus main body, the CPU 30 selects a destination address from an address book in accordance with a designation operation by the user, and sets the destination address as a transmission destination for a mail (step S31).

Next, in response to the user's designation operation, the CPU 30 attaches, to the electronic mail, character data of a front character designated by the user (step S32).

Next, the electronic mail is transmitted in accordance with a user's transmission instruction (step S33). The mail is saved into a predetermined mail server (not shown).

Next, the electronic mail is received by a second game machine (step S34). As a reception method, for example, a method of regularly accessing the mail server to check arrival of a new mail is considered. The received mail is saved into a reception box of the second game machine.

Next, a user starts up a mail application in the second game machine. In this case, the CPU 30 accesses the reception box, and displays the arrival of a new electronic mail on the screen. When the user opens the received electronic mail, the CPU 30 copies a character image and a character ID in the electronic mail to the back DB 339 while associating the character image with the character ID (step S35). Thus, the character data transferring process according to the second exemplary embodiment is completed.

Thus, a first user (the user A) sets a front character image created by itself as mail header information, and transmits the resultant mail to a second user, so that the front character of the first user is saved as a back character into the game apparatus main body possessed by the second user. Therefore, the number of back characters can be increased only by transferring a mail.

Note that transmission and reception of an electronic mail may be performed without a user's operation, instead of control by user's intention. For example, the CPU 30 may randomly select a transmission destination from an address book of its machine with predetermined timing. The CPU 30 may also randomly select a character image from the front DB 334 or the back DB 339, set the character image in a mail header, and create and send a blank mail without a main text (hereinafter referred to as a distribution mail).

Figure 18:
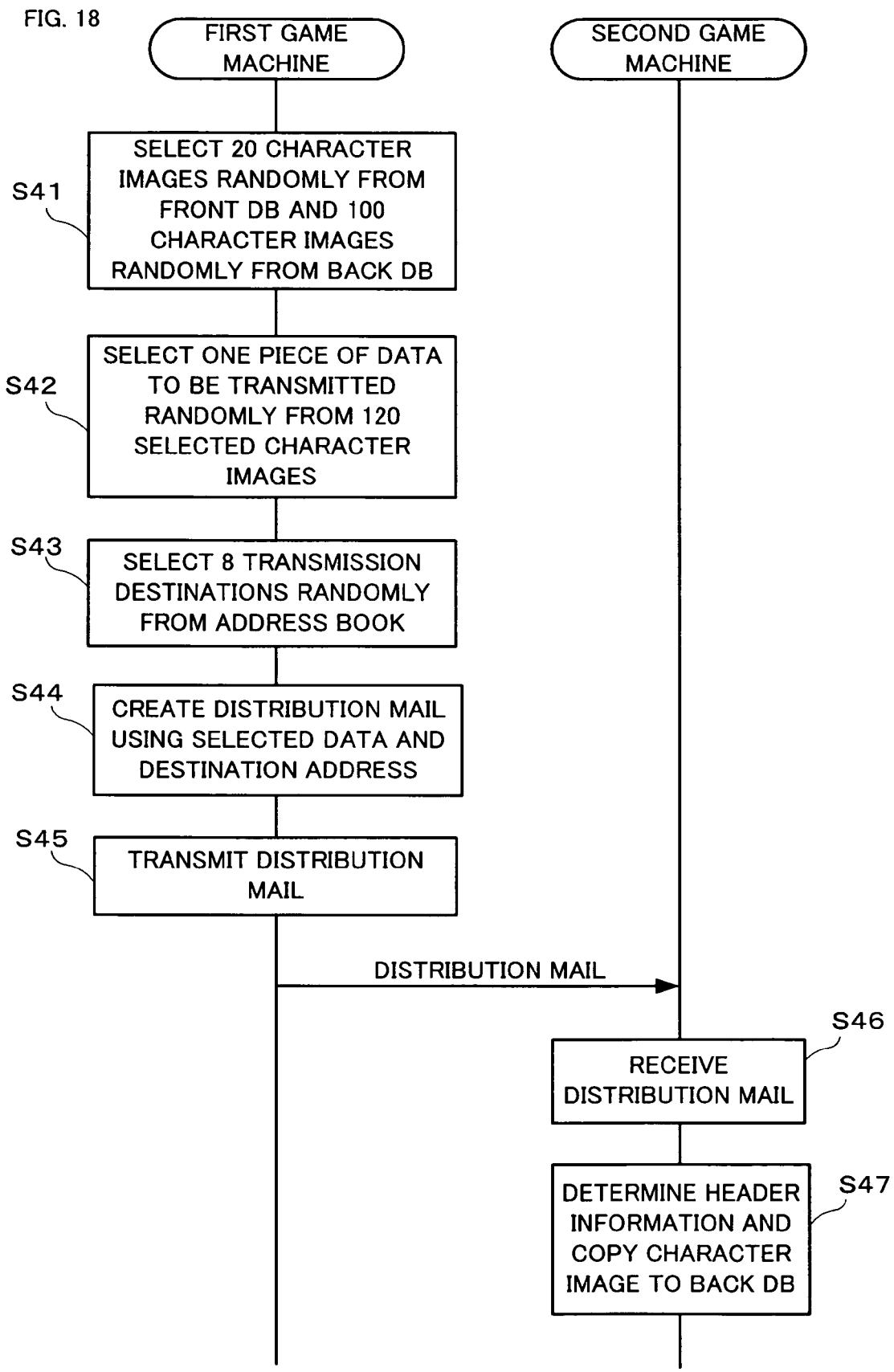
FIG. 18 is a diagram illustrating a flow of transmission and reception of a distribution mail.

FIG. 18 is a diagram illustrating a flow of transmission and reception of the distribution mail without a user's operation. In this flow, S41 to S45 indicate steps in which a distribution program (this application program is stored in a non-volatile memory (e.g., the flash memory 38) of a game apparatus main body 3) is executed by the CPU 30 or the sub-CPU (not shown) of a sender's game apparatus main body 3. S46 indicates a step in which the mail receiving application is executed by the CPU 30 or the sub-CPU (not shown) of a receiver's game apparatus main body 3. S47 indicates a step in which the distribution program is executed by the CPU 30 or the sub-CPU (not shown) of the receiver's game apparatus main body 3. Note that the distribution program is continuously executed by the CPU 30 or the sub-CPU when a game apparatus main body 3 is active. Processes of S41 and thereafter are executed at set times based on a predetermined schedule. Note that the schedule data is set in the flash memory 38. Power may be supplied to the sub-CPU in a sleep mode so that the distribution program is operated in the sleep mode.

Initially, in the first game machine, the CPU 30 randomly selects 20 character images from the front DB 334 and 100 character images from the back DB 339 so as to select a character image to be transmitted (step S41). Next, the CPU 30 selects a character image from a total of 120 selected character images with equal probabilities (step S42).

Next, the CPU 30 randomly selects eight destination addresses from an address book saved in the first game machine to select transmission destinations (step S43).

Next, a distribution mail for the eight selected destination addresses is created (step S44). Specifically, the eight randomly selected addresses are set as transmission destinations. Thereafter, data of the randomly selected character image is attached along with the character ID of the character to the mail. The main text of the mail is left blank. Note that a flag indicating a distribution mail may be added to the main text or the header of the mail.

Next, the CPU 30 transmits the thus-created distribution mail (step S45). Next, in a game apparatus main body 3 which is the transmission destination, a process of reception via the mail server is executed, and the received mail is stored into a reception buffer (flash memory) (step S46). The distribution program references the reception buffer to check whether or not a distribution mail is present (using the above-described flag). If a distribution mail is present, character data attached to the mail is copied to the back DB (step S47). In other words, when a game apparatus main body 3 as a transmission destination receives the electronic mail, a process of copying to the back DB is executed no matter whether or not the user opens the mail.

As described above, in the second exemplary embodiment, transmission and reception of a character image are automatically performed without a user's transmission operation. In addition, all characters transmitted by a sender are registered as back characters in a transmission destination no matter whether the character transmitted by the sender is a front character or a back character. Therefore, the number of back characters in each game apparatus main body can be increased while the user is not aware of it.

Third Exemplary Embodiment

Next, a third exemplary embodiment will be described. In the first exemplary embodiment above, character data in the flash memory 38 of a game apparatus main body 3 is transferred via a controller 7 to the flash memory 38 of another game apparatus main body 3. In the third exemplary embodiment, character data saved in a controller 7 is simply used in a game process. Note that the game apparatus main body of the third exemplary embodiment has a functional block diagram and a hardware configuration block diagram similar to those of the first exemplary embodiment (see FIGS. 1 to 7). Therefore, like parts are indicated by like reference numerals and will not be described in detail.

Next, a process according to the third exemplary embodiment will be described. A game assumed in this exemplary embodiment is a game in which players compete against each other, causing teams of monster characters to battle each other. In this multiplayer competition game, initially, a process of generating data of monster characters which are used by a user (e.g., character images, ability data, etc.) is executed. The process may have any specific contents. For example, a plurality of pieces of monster character data may be prepared in a program, and the user may select desired data, or any character data may be selected when a predetermined condition is satisfied or may be determined using random numbers. The monster character data (ability data) is changed when a game is played. For example, the monster character data is changed due to a battle with other monster characters. The monster character data is stored in the main memory 33 or the flash memory 38. The monster character data stored in the main memory 33 or the flash memory 38 can be moved or copied to the memory 752 of a controller 7 as in the first exemplary embodiment. A user A goes to the house of a user B, carrying the controller 7 which stores the monster character data, and connects the controller 7 to a game apparatus main body 3 possessed by the user B. The user B also connects its own controller 7 to the game apparatus main body 3. The monster character data stored in each user's controller 7 is read into the game apparatus main body 3. Specifically, the game apparatus main body 3 transmits, to each linked controller 7, control data for providing an instruction to transmit the monster character data. In response to this, each controller 7 transmits its own monster character data to the game apparatus main body 3. The game apparatus main body 3 stores the monster character data transmitted from each controller 7 into the main memory 33. Note that, regarding the user B, the monster character data may not be read from the controller 7, and team data stored in the game apparatus main body 3 possessed by the user B may be used. In this case, the game apparatus main body 3 stores the read monster character data and information for identifying the controller 7 from which the monster character data has been read (the channel number of the controller 7, the connection identification information, the unique ID of the controller 7, etc.) into the main memory 33 while associating the monster character data and the information. Thereafter, a process of playing a multiplayer competition game is executed using operational information about each connected controller 7. In this process, as data of a monster character operated based on operational information from each controller 7, monster character data stored in the main memory 33 in association with the controller 7 is used. Specifically, in the main memory 33, identification information A for identifying a controller 7a is added to monster character data read from the controller 7a of the user A, and identification information B for identifying a controller 7b is added to monster character data read from the controller 7b of the user B. Based on operational information from the controller 7a, the monster character data added with the identification information A in the main memory 33 is used to execute a process of operating a monster character A, and based on operational information from the controller 7b, the monster character data added with the identification information B in the main memory 33 is used to execute a process of operating a monster character B.

Note that, when a plurality of pieces of monster character data are stored in the controller 7, the plurality of pieces of monster character data are read into the main memory 33, and the user may select desired monster character data as a monster character which is used in the multiplayer competition game from the plurality of pieces of monster character data. Also in this case, monster character data added with the information for identifying a controller 7 is stored in the main memory 33. Data of a monster character selected based on operational information from each controller 7 is monster character data associated with the controller 7 in the main memory 33. Specifically, for example, based on operational information from the controller 7a, a process of selecting a desired monster character from a plurality of pieces of monster character data added with the identification information A in the main memory 33 is executed.

Figure 19:
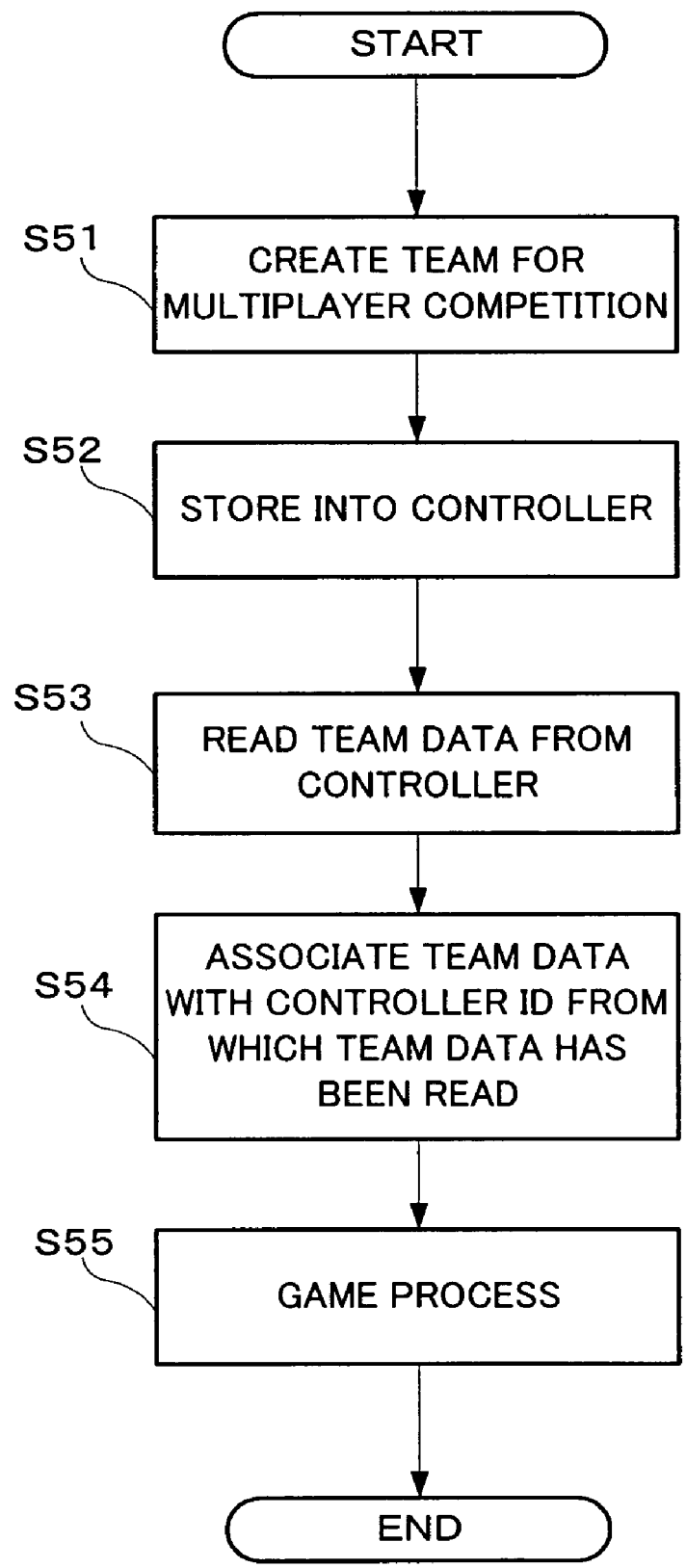
FIG. 19 is a flowchart illustrating a detail of a game process according to a third exemplary embodiment.

FIG. 19 is a flowchart illustrating a detail of a game process according to the third exemplary embodiment. In the flowchart, a multiplayer competition game program which is stored in the optical disc 4 or the flash memory 38, is executed by the CPU 30. In FIG. 18, initially, monster character data for multiplayer competition is generated in the game apparatus main body 3 possessed by the user A (step S51). For example, the CPU 30 executes a predetermined game program in accordance with a designation operation by the user A. The user A plays in a "single-player mode" to collect monster characters in a virtual game space. The monster character data is stored into the main memory 33 or the flash memory 38.

Next, the CPU 30 copies the monster character data in the main memory 33 or the flash memory 38 to the controller 7 (step S52). For example, when a team for multiplayer competition includes five monster characters, data about the team, such as data of the five monster characters, a team name, and the like, are copied to the controller 7.

Next, it is assumed that the user A goes to the house of the user B, carrying the controller 7 which stores the monster character data. A game program for multiplayer competition is executed in the game apparatus main body 3 possessed by the user B. In response to this, the CPU 30 reads the monster character data stored in the controller 7 (step S53). Next, the CPU 30 stores the read data and information for identifying a controller 7 from which the data has been read, into the main memory 33 while associating the data with the information (step S54).

Next, a predetermined game process is executed (step S55). In the game process, the monster character accepts only operations from the controller 7 possessed by the user A. For example, it is assumed that a list of user A's monster characters and user B's monster characters is displayed on a monster character selection screen. In this case, for example, it is assumed that the user B operates its own controller 7 to place a cursor on a monster character of the user A, and pushes down a selection determining button. However, the CPU 30 identifies the controller ID of the controller 7 on which the selection determining button has been pushed down, and invalidates the determination input. In this case, a message indicating that the character of interest cannot be selected may be displayed on the screen. Alternatively, even when the user B operates its own controller 7, the cursor may be prevented from being placed on a monster character of the user A. Thus, the game process according to the third exemplary embodiment is completed.

As described above, in the third exemplary embodiment, a controller and data stored in the controller can be used while associating the controller with the stored data. In addition, since a memory for storing data is integrated with a controller, even when a user inputs its own data to a game apparatus main body other than a game apparatus main body possessed by the user, a controller of the user can be operated with respect to the game apparatus main body possessed by another user, resulting in an improvement in user's convenience.

Since the above-described association has been obtained when data is read from a controller, multiplayer competition or the like can be performed without displaying a character selection screen, resulting in an improvement in user's convenience. Conventionally, a list of read monster data needs to be displayed, and each user needs to select desired monster data. However, as described above, a controller and data read from the controller are stored in a game apparatus main body while the controller is associated with the data, so that multiplayer competition can be quickly started without causing the user to execute a list display operation and a selection operation.

In addition, each user can operate a controller which the user is used to operating, thereby making it possible to maintain convenience depending on each user. For example, if each user customizes a key arrangement which facilitates operations or registers a finishing move command, by key configuration, the user can bring its own home operation environment to the house of a friend.

Note that only any of a plurality of monster characters stored in a controller as described above may be selected and stored into a game apparatus main body. For example, a controller data read screen is displayed, and on the screen, a list of monster characters in a controller is displayed. Thereafter, in response to a user's select operation, only a selected monster character(s) may be read into a game apparatus main body. Thereby, a memory area of a game apparatus main body can be reduced.

Data stored in a controller may not be copied to a game apparatus main body when a game process may be performed. For example, when data of a character for multiplayer competition is read, data in a controller may not be stored into the main memory of a game apparatus main body, i.e., the main memory may not be accessed to display a character. Specifically, a memory of a controller may be directly accessed to read data, and a character may be displayed on a screen. Thereby, a memory area of a game apparatus main body can be reduced.

While the certain exemplary embodiments have been described in detail, the foregoing description is in all aspects illustrative and not restrictive. It is understood that numerous other modifications and variations can be devised without departing from the scope of these certain exemplary embodiments.

What is claimed is:

1. A game system comprising a plurality of game apparatuses which can communicate with each other, wherein a first game apparatus comprises:
   a storage section for storing data relating to a player object that is selectable by a player as first group data, and for storing data relating to a non-player object that is not selectable by a player as second group data, the first group data and the second group data being distinguishable from each other;
   a communication section for facilitating communication between the first game apparatus and a second game apparatus;
   a transmission control section for transmitting at least one of the first group data and the second group data, which are stored in the storage section, from the first game apparatus to the second game apparatus by using the communication section;
   a reception control section for receiving the data transmitted from the second game apparatus using the communication section, and
   a game processing section for performing game processing using the player object and the non-player object, wherein the first game apparatus stores the data received from the second game apparatus using the reception control section as second group data into the storage section.

2. The game system according to claim 1, wherein the first game apparatus further comprises:
   a player object selecting section for selecting data of a player object from the first group data stored in the storage section; and
   a non-player object selecting section for selecting data of a non-player object from the second group data stored in the storage section.

3. The game system according to claim 2, wherein data stored in the storage section is image data of an object, and the first game apparatus further comprises:
   a display control section for displaying a player object in a virtual space using the data selected by the player object selecting section, and displaying a non-player object in the virtual space using the data selected by the non-player object selecting section.

4. The game system according to claim 1, wherein the first game apparatus further comprises:
   an editing section for editing data stored in the storage section based on a user's operation,
   wherein the editing section can select only the first group data stored in the storage section as data to be edited.

5. The game system according to claim 4, wherein, of the first group data, data which is not generated by a game apparatus in which the first group data is stored, cannot be edited.

6. The game system according to claim 1, wherein the first game apparatus further comprises:
   a first selection section for selecting data stored in the storage section using random numbers,
   wherein the transmission control section transmits the data selected by the first selection section.

7. The game system according to claim 1, wherein the storage section further stores destination address information which is information indicating a location of the second game apparatus on a network, and
the transmission control section transmits the data to a destination address selected using random numbers of the destination address information.

8. The game system according to claim 1, wherein the first game apparatus further comprises:
   a second selection section for selecting data desired by a user from the first group data based on a user's operation,
   wherein the transmission control section transmits the data selected by the second selection section.

9. The game system according to claim 1, wherein the transmission control section transmits the data with predetermined timing which does not depends on a player's operation.

10. A game system comprising a plurality of game apparatuses which can communicate with each other, wherein the game first apparatus comprises:
    storage circuitry configured to store character data relating to a player object that is selectable by a player as first group data, and to store character data relating to a non-player object that is not selectable by a player as second group data, the first group data and the second group data being distinguishable from each other;
    communication circuitry configured to facilitate communication between the first game apparatus and a second game apparatus;
    transmission control circuitry configured to transmit at least one of the first group data and the second group data stored in the storage logic circuitry from the first game apparatus to the second game apparatus using the communication circuitry; and
    reception control circuitry configured to receive the character data transmitted from the second game apparatus using the communication circuitry,
    game processing circuitry for performing game processing using the player object and the non-player object, wherein
    the first game apparatus is configured to store the character data received using the reception control circuitry, as second group data, into the storage circuitry.

11. The game system according to claim 10, wherein each piece of character data is formed of a plurality of parts.

12. The game system according to claim 10, wherein the character data can be used in common in a plurality of games.

13. A game apparatus comprising:
    a memory configured to store data relating to a player object that is selectable by a player as first group data, and to store data relating to a non-player object that is not selectable by a player as second group data, the first group data and second group data being distinguishable from each other;
    a transmitter configured to transmit at least one of the first group data and the second group data from the game apparatus to another game apparatus;
    a receiver configured to receive the data transmitted from the another game apparatus; and
    a processor configured to perform game processing using the player object and the non-player object, wherein
    the game apparatus is configured to store the received data, as second group data, in the memory.

14. A method for communication between a plurality of game apparatuses, comprising
    storing, in a memory of a first game apparatus, data relating to a player object that is selectable by a player as first group data, and data relating to a non-player object that is not selectable by a player as second group data, the first group data and the second group data being distinguishable from each other;

transmitting at least one of the data belonging to the first group data and the second group data, which are stored in the memory of the first game apparatus, to a second game apparatus;

receiving the data transmitted from the second game apparatus; and performing game processing using the player object and the non-player object, wherein the first game apparatus stores the data received from the second game apparatus as second group data.

15. A non-transitory recording medium recording a game program which is executed by a first game apparatus, the game program causing a computer to execute:

storing, in a memory of the first game apparatus, data relating to a player object that is selectable by a player as first group data, and data relating to a non-player object that is not selectable by a player as second group data, the first group data and the second group data being distinguishable from each other;

transmitting at least one of the first group data and the second group data, which are stored in the memory of the first game apparatus, to a second game apparatus;

receiving the data transmitted from the second game apparatus; and performing game processing using the player object and the non-player object, wherein the first game apparatus is configured to store the data received from the second game apparatus as second group data.

16. A game apparatus comprising a memory configured to store character data relating to a player object that is selectable by a player as first group data, and character data relating to a non-player object that is not selectable by a player as second group data, the first and the second group data being distinguishable from each other;

a transmitter configured to transmit at least one of the first group data and the second group data to another game apparatus; and a receiver configured to receive the character data transmitted from another game apparatus; and a processor configured to perform game processing using the player object and the non-player object, wherein the game apparatus configured to store the character data received from the another game apparatus as second group data.

17. A method for communication between a plurality of game apparatuses, comprising:

storing, in a memory of a first game apparatus, character data relating to a player object that is selectable by a player as first group data, and character data relating to a non-player object that is not selectable by a player as second group data, the first and the second group data being distinguishable from each other;

transmitting at least one of the first group data and the second group data to a second game apparatus;

receiving the character data transmitted from the second game apparatus; and performing game processing using the player object and the non-player object, wherein the first game apparatus stores the character data received from the second game apparatus as second group data.

18. A non-transitory recording medium recording a game program which is executed by a first game apparatus, the game program causing a computer to execute:

storing, in a memory of the first game apparatus, character data relating to a player object that is selectable by a player as first group data, and character data relating to a non-player object that is not selectable by a player as second group data, the first and the second group data being distinguishable from each other;

transmitting at least one of the first group data and the second group data to a second game apparatus;

receiving the character data transmitted from the second game apparatus; and performing game processing using the player object and the non-player object, wherein the first game apparatus stores the character data received from the second game apparatus as second group data.

* * * * *